US008620687B2

(12) United States Patent
Saidel et al.

(10) Patent No.: US 8,620,687 B2
(45) Date of Patent: *Dec. 31, 2013

(54) SYSTEMS AND METHODS FOR HEALTH CARE CREDIT TRANSACTIONS

(71) Applicant: Stage 5 Innovation, LLC, Washington, DC (US)

(72) Inventors: Andrew M. Saidel, North Potomac, MD (US); David K. Rosen, Guilford, CT (US)

(73) Assignee: Stage 5 Innovation, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/945,288

(22) Filed: Jul. 18, 2013

(65) Prior Publication Data

US 2013/0304497 A1 Nov. 14, 2013

Related U.S. Application Data

(63) Continuation of application No. 13/486,427, filed on Jun. 1, 2012, now Pat. No. 8,504,389, which is a continuation-in-part of application No. 13/273,456, filed on Oct. 14, 2011.

(51) Int. Cl.
*G06Q 50/00* (2012.01)
*G06Q 10/00* (2012.01)

(52) U.S. Cl.
USPC ................................................ 705/2; 705/35

(58) Field of Classification Search
USPC .......................................................... 705/2
See application file for complete search history.

(56) References Cited

U.S. PATENT DOCUMENTS

| | | |
|---|---|---|
| 5,819,228 A | 10/1998 | Spiro |
| 5,937,387 A | 8/1999 | Summerell et al. |
| 6,269,339 B1 | 7/2001 | Silver |
| 6,904,336 B2 | 6/2005 | Raines et al. |
| 7,133,750 B2 | 11/2006 | Raines et al. |
| 7,541,547 B2 | 6/2009 | McGuire et al. |
| 7,624,037 B2 | 11/2009 | Bost |
| 7,801,786 B2 | 9/2010 | Smith et al. |
| 7,828,205 B2 | 11/2010 | Cronin et al. |
| 7,925,519 B2 | 4/2011 | Greene |
| 7,967,731 B2 | 6/2011 | Kil |
| 8,504,389 B2 * | 8/2013 | Saidel et al. ............... 705/2 |
| 2002/0077219 A1 | 6/2002 | Cohen et al. |
| 2002/0123908 A1 | 9/2002 | Ando et al. |
| 2003/0065561 A1 | 4/2003 | Brown et al. |
| 2005/0010439 A1 | 1/2005 | Short |
| 2005/0234742 A1 | 10/2005 | Hodgdon |

(Continued)

OTHER PUBLICATIONS

Baicker, Policy Watch: Trade Adjustment Assistance, 2004, American Economic Association, vol. 18, No. 2, pp. 239-255.*

(Continued)

*Primary Examiner* — Tran Nguyen
(74) *Attorney, Agent, or Firm* — MH2 Technology Law Group, LLP

(57) ABSTRACT

Systems, methods, and computer program media for creating, managing, backing, and transferring health care credits are described. Health care credits may be implemented as freely transferable financial instruments whose initial value can be based on costs or savings generated by an individual, or by a health care provider, that are associated with a health-related metric or a health benefiting behavior(s).

45 Claims, 19 Drawing Sheets

(56) References Cited

U.S. PATENT DOCUMENTS

| | | | |
|---|---|---|---|
| 2006/0064331 | A1 | 3/2006 | Odermott et al. |
| 2006/0111944 | A1 | 5/2006 | Sirmans, Jr. et al. |
| 2007/0192195 | A1 | 8/2007 | Asmar et al. |
| 2008/0109263 | A1 | 5/2008 | Clark et al. |
| 2008/0162496 | A1 | 7/2008 | Postrel |
| 2008/0255873 | A1 | 10/2008 | Berkley |
| 2009/0018870 | A1 | 1/2009 | Weishaar |
| 2009/0063197 | A1 | 3/2009 | Lisle |
| 2010/0211416 | A1* | 8/2010 | Frank et al. ............ 705/4 |
| 2010/0235196 | A1 | 9/2010 | Bartholomew, III et al. |
| 2011/0015960 | A1 | 1/2011 | Martin et al. |
| 2011/0087503 | A1 | 4/2011 | Desai |
| 2011/0137784 | A1 | 6/2011 | Douglas |
| 2011/0160544 | A1 | 6/2011 | Hayter |
| 2011/0161255 | A1 | 6/2011 | Short |
| 2013/0096933 | A1 | 4/2013 | Saidel et al. |

OTHER PUBLICATIONS

Katherine Baiker et al., "Policy Watch—Trade Adjustment Assistance," Journal of Economic Perspectives, Spring 2004, pp. 239-255, vol. 18, No. 2, Washington, DC.

Author Unknown, Discovery Vitality, Annexure 1: Points for each benefit and status, 10 pages http://www.discovery.co.za/discovery_za/web/pdfs/vitality/summary_of_points.pdf.

Author Unknown, Discovery Vitality, Main rules for Discovery Vitality, 10 pages http://www.discovery.co.za/web/pdfs/vitality/summary_of_vitalitys_rules.pdf.

Volpp et al., "Redesigning Employee Health Incentives—Lessons from Behavioral Economics", New England Journal of Medicine, 365:5, NEJM.org, Aug. 4, 2011, pp. 388-390 http://www.nejm.org/doi/full/10.1056/NEJMp1105966, accessed Aug. 16, 2012, pp. 1-3.

Volpp et al., "Health Affairs—P4P4P: An Agenda for Research on Pay-For-Performance for Patients", Health Affairs, 28, No. 1, 2009, pp. 206-214 http://content.healthaffairs.org/contenc/28/1/206.full, accessed Aug. 16, 2012, pp. 1-10.

Volpp et al., "A test of financial incentives to improve warfarin adherence", BMC Health Services Research, 8:272, 2008, pp. 1-6 http://www.biomedcentral.com/1472-6963/8/272/, accessed Aug. 16, 2012, pp. 1-6.

Author Unknown, "Life Points", http://cdphp.com/members/life_points.aspx, accessed Jan. 5, 2012, 1 page.

Author Unknown, "GEHA—Member Web Services—Overview/Demo", http://www.geha.com/webenablement/member_demo.asp, accessed Jan. 5, 2012, pp. 1-3.

GEHA, "Keynotes" newletter, Fall 2011, accessed Jan. 5, 2012, pp. 1-4.

United Healthcare, "UnitedHealthCare's 'UnitedHealth Personal Rewards' Program Gives Consumers Customized Road Maps to Healthier Lifestyles", http://www.uhc.com/news/2010 news_release_archive/unitedhealth_personal_reward_program.htm, accessed Jan. 5, 2012, pp. 1-4.

Author Unknown, International Search Report and Written Opinion dated Jan. 4, 2013, PCT Application No. PCT/US2012/59486, filed Oct. 10, 2012, published by the WIPO, pp. 1-10.

International Search Report and Written Opinion dated Mar. 13, 2013, PCT Application No. PCT/US2012/59457, filed Oct. 10, 2012, published by the WIPO, pp. 1-18.

Notice of Allowance dated Jun. 7, 2013, U.S. Appl. No. 13/486,427, filed Jun. 1, 2012, pp. 1-67.

* cited by examiner

|  | Behavior | Std. Ref. (Medicare) | Co. A | Co. B | Co. C |
|---|---|---|---|---|---|
| 1330 | Procedure X | $100 | 50 pts. | 200 pts. | 100 pts. |
| 1335 | Behavior Y | $200 | 100 pts. | 380 pts. | 210 pts. |
| 1340 | Activity Z | $300 | NA | 600 pts. | NA |
| 1345 | Regimen A | NA | 150 pts. | NA | NA |
| 1350 | Procedure B | NA | NA | 700 pts. | NA |

FIG. 13

SYSTEMS AND METHODS FOR HEALTH CARE CREDIT TRANSACTIONS

RELATED APPLICATIONS

This application is a continuation of, and claims benefit of, prior application Ser. No. 13/486,427 filed Jun. 1, 2012, which is a continuation-in-part of, and claims benefit of, prior application Ser. No. 13/273,456 filed on Oct. 14, 2011, both of which are hereby incorporated by reference in their entirety. This application is related to the following commonly-assigned, co-pending U.S. patent application Ser. No. 13/273,430, entitled "SYSTEMS AND METHODS FOR PROCESSING THE REDEMPTION OF HEALTH CARE CREDITS" by the same inventors; and Ser. No. 13/273,366, entitled "SYSTEMS AND METHODS FOR PROVIDING HEALTH CARE CREDITS TO SUBSCRIBERS" by the same inventors; both of which were filed on Oct. 14, 2011, and the entire disclosures of which are incorporated herein by reference.

FIELD

This invention generally relates to systems and methods for health care systems. More particularly, this invention relates to platforms and techniques for monetizing, transferring, and exchanging credits representing health care related actions and outcomes.

BACKGROUND

Health insurance is insurance that pays for all, or a portion, of the expenses incurred by an individual for health-related care, such as medical care, medications, etc. Generally, a health insurance company (i.e., health insurer) provides health care benefits to an individual as specified in an insurance policy or insurance plan, in exchange for periodic payments or premiums. By modeling the risk of health care expenses for a group of people that the insured belongs to (e.g., Caucasian males aged 40-50), the insurer can calculate a premium that provides enough assets to pay for the health care benefits specified in the insurance plan, should the need arise.

Because health care is expensive, health care insurance is also expensive. As a consequence there are many disenfranchised people who do not have health care insurance, do not have enough health care insurance, or do not have the correct health care insurance, because they cannot afford it. Moreover, because they cannot afford health care, the uninsured and underinsured often avoid seeking health care until or unless they develop acute symptoms or chronic illnesses. Often, medical problems that would have been easily and inexpensively solved in the early stages have become complex and expensive to solve by the time the uninsured and underinsured seek care. Even though non-emergency care providers often will not treat the uninsured and underinsured because they cannot pay, uninsured and underinsured patients nonetheless obtain expensive health care treatments in emergency rooms that legally cannot deny them care. The cost of caring for the uninsured and underinsured is passed on in higher prices to insurance companies and insured patients.

A fairly new development in health care is the practice of evidence-based medicine or evidence-based health care. Evidence-based health care seeks to provide treatment, services, and medications for a health problem based on the best currently available evidence regarding treatment of the health problem. The evidence may be obtained from sources that range from highly scientific, published clinical trials to conventional wisdom. Evidence-based health care is most effective in those areas of medical practice that have been frequent subjects of scientific studies, usually from clinical trials; i.e., those areas that have accumulated the most evidence that is accessible to medical practitioners.

By systematically and scientifically identifying effective, ineffective, and harmful treatments, evidence-based health care may reduce health care costs by reducing expenditures on ineffective and harmful treatments.

There are several novel improvements that may be made to conventional health care payment systems and health insurance, as well as improvements to evidence-based health care.

SUMMARY

Disclosed are systems, methods, and computer-executable media for facilitating health care credit transactions, which perform operations for, and/or include means for, receiving via a network, at a server system, information indicating health care credits calculated and awarded based on data indicative of individuals' health or behaviors affecting individuals' health, associating the health care credits with entities by updating, at a database in communication with the server system, profiles or data files associated with the entities, enabling access, over the network, to one or more accounts containing the health care credits, receiving via the network, at the server system a first indication, the first indication indicating a desire or permission to transfer an interest in one or more health care credits, receiving via the network, at the server system a second indication, the second indication indicating a desire to receive the interest in the one or more health care credits, and in response to the first indication and the second indication, executing, using the server system and the database, a transaction to transfer the one or more health care credits from an account associated with the first indication.

For other variants, also disclosed are systems, methods, and computer-executable media for providing a health care credit program, which perform operations for, and/or include means for, receiving, over a network, data indicative of a metric of an individual's health or a behavior affecting the individual's health, processing the data to calculate a health care credit amount to award the individual, based on the metric or the behavior, associating with the individual a health care credit corresponding to the health care credit amount, by updating a profile or data file associated the individual, and enabling the individual to receive value associated with the health care credit by enabling the individual to access, over a network, an account containing the health care credit, and use the health care credit as a transferable financial instrument.

For yet other variants, also disclosed are systems, methods, and computer-executable media for providing a health care credit program, which perform operations for, and/or include means for, receiving, over a network, data indicative of a metric of an individual's health or a behavior affecting the individual's health, processing the data to calculate a health care credit amount to award the individual, based on the metric or the behavior, associating with the individual a health care credit corresponding to the health care credit amount, by updating a profile or data file associated the individual; and creating a transferable financial instrument associated with the health care credit that is recognized as having value and convertible to other forms of value.

For still other variants, also disclosed are systems, methods, and computer-executable media for providing health care credit market transactions, which perform operations for, and/or include means for, receiving, over a network, data indicative of a metric of the health of a plurality of individuals or behaviors affecting the health of a plurality of individuals, processing the data to calculate a health care credit amount to award to one or more of the individuals, based on one or more of a metric or a behavior identified in the data, associating with one or more of the individuals a health care credit corresponding to a respective health care credit amount, by updating a profile or data file associated the corresponding individual, creating a plurality of transferable financial instruments associated with the health care credits, wherein the transferable financial instruments are payable to the one or more of the individuals, and enabling individuals to buy, sell, transfer, or use the transferable financial instruments by enabling individuals to access the health care credits over a network. Additional variants are also disclosed.

For still other variants, a method, implemented using a computing system, is disclosed for health care credit transactions. The method includes receiving, at a server system over a network, information indicating health care credits calculated and awarded based on data indicative of individuals' health or behaviors affecting individuals' health. The method further includes updating, at a database provided in communication with the server system, a profile or data file associated with the individuals, for associating with the individuals health care credits defined by the received information. The method further includes enabling value associated with health care credits to be received by enabling the access, over a network, to an account containing the health care credits. The method further includes receiving, at the server system over a network, an indication of a desire or permission to convey an interest in one or more health care credits; and receiving, at the server system over a network, an indication of a desire to purchase or transfer health care credits. In one embodiment, the server system and the database are configured to execute a transaction to convey the health care credits or their value to recipients as desired and permitted and update an account to reflect the results of the transaction.

BRIEF DESCRIPTION OF THE DRAWINGS

The accompanying drawings, which are incorporated in and constitute a part of this specification, illustrate embodiments and implementations of the present disclosure and together with the description, serve to explain the embodiments and implementations. Wherever convenient, the same reference numbers may be used to refer to the same or like features.

In the drawings:

FIG. 13 illustrates an example of deriving a par value for a health-related behavior based on the value of other health-related behaviors in relation to a standard reference, consistent with embodiments of the invention;

DETAILED DESCRIPTION

Overview

Figure 1:
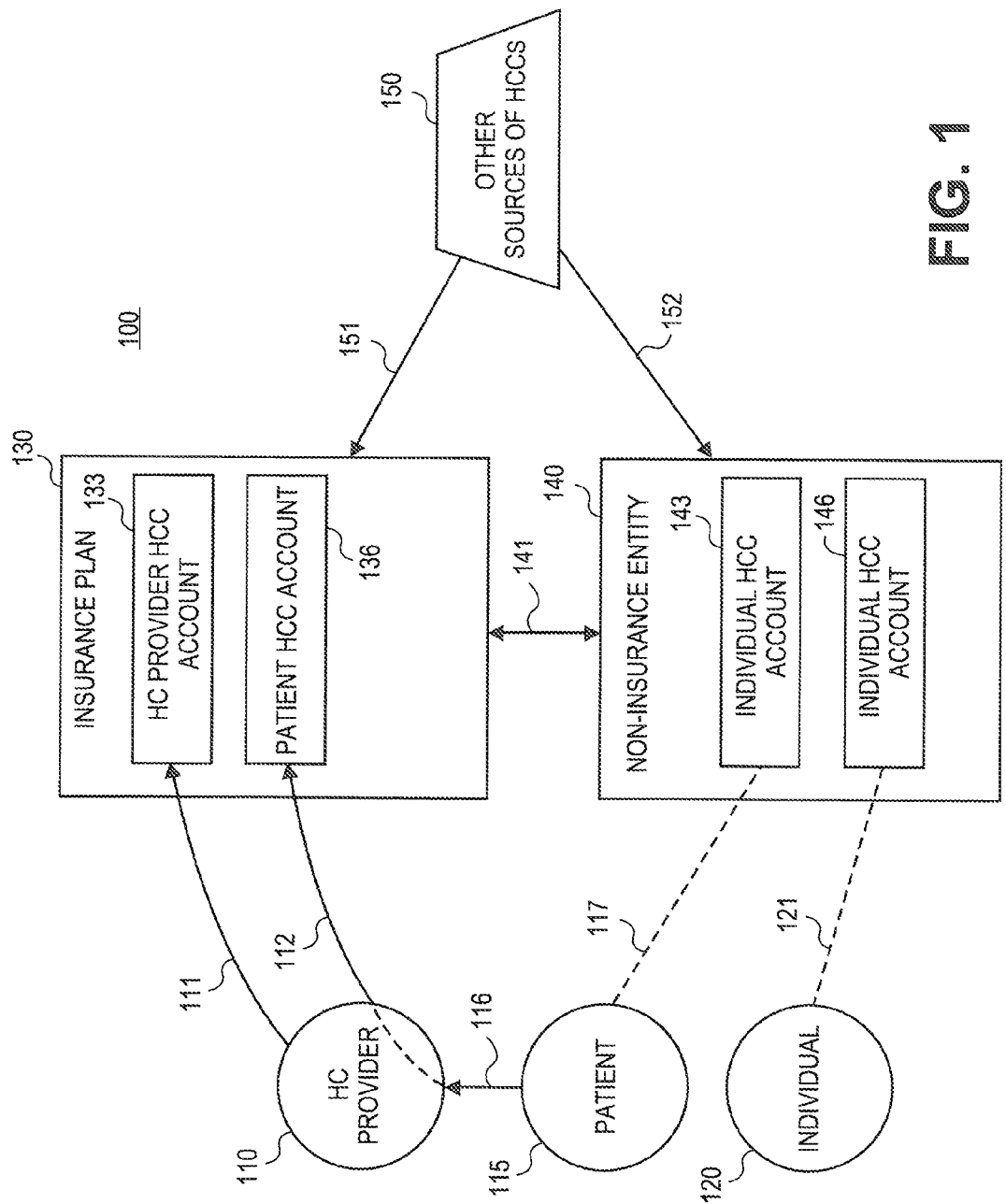
FIG. 1 is a block diagram of exemplary health care credit accounts, consistent with the principles of the invention.

Good health behavior is illiquid in the United States, and that illiquidity costs the United States economy hundreds of billions of dollars every year. Millions of Americans pay for much more health care coverage than they ever use. Millions more Americans cannot afford the health care they need, and millions more still consider themselves entitled to health care that they are not paying for. The health care system in the United States is suffering from soaring costs, lack of accountability, and limited access to alternative payment mechanisms. Medicare and Medicaid reflect how exposed the U.S. Government and states are to these inefficiencies. One fundamental cause of the problem is the lack of a "market" for good behavior. There is currently no way for good behavior to be shared or transferred in the system to increase accountability and "ownership" of choices that enhance health and save money. With little ability to control demand, employers and insurance plans are in effect limiting supply by, e.g., capping benefits. These caps increasingly come in the form of incentives for employees or subscribers to achieve greater wellness. However, the incentives are unlikely to motivate the people who cost the system the most—those with chronic conditions and those who lack the wherewithal to engage in healthy behaviors.

In view of the problems outlined above, various embodiments of a health care credits and exchange system are disclosed for creating a market for good health-related behavior by addressing the need for transferable incentives. In various implementations of a system, credits can be earned, purchased, traded, donated, or otherwise exchanged. For example, a son can sell the credits he has earned to help his mother pay for cancer treatment. A sister can transfer her credits to her sibling to help him pay for needed pharmaceutical therapeutics. A working, single mother who does not qualify for health insurance can obtain care for her children via health care credits donated by a philanthropic organization. In some embodiments, the credits may be securitized or monetized to enable either their transfer or a way to trade on underlying data the credits represent, such that not only would healthy behaviors and choices be rewarded, the rewards would be tradable and obtainable by people in the system who are unable to engage in healthy behaviors and choices.

Some of the various embodiments consistent with the present disclosure create and utilize Health Care Credits ("HCCs"). Generally, a "health care credit," as used herein, can refer to an award, reward, or other type of credit provided to an individual that rewards the individual for good health and/or healthy behaviors, as well as incentivizes the individual to maintain and/or improve their health level. In various embodiments, health care credits have intrinsic value because they can be used and accepted as a payment for health care services received by the individual, thus monetizing the health care credits or using the credits as a sort of currency. Further, the health care credits can be freely transferable, sellable, conveyable, and/or the like, to other individuals, subscribers, and/or entities and exchanged for goods and services. Still further, the health care credits can be securitized. Moreover, the health care credits can be bought, sold, and exchanged in a market-type environment comprising authorized agents, brokers, channels, exchanges and/or other entities or components.

Various implementations of HCCs provide several advantageous improvements to current health care systems. For example, awarding HCCs to individuals (e.g., patients) and/or health care providers (e.g., physicians) provides a direct incentive to maintain or improve health for these participants in the health care system. For instance, a patient may be awarded HCCs for achieving an improved health level outcome, such as a reduced cholesterol level or BMI. Similarly, a physician may earn HCCs for formulating the regimen that the patient successfully followed to produce the improved health level outcome, (e.g., increased exercise and a prescription for a cholesterol-reducing medication). HCCs may also incentivize behaviors in the preventative health area, such as awarding HCCs to patients who engage in healthy behaviors (e.g., exercise, regularly take medication, etc.), even if the patient's health level does not necessarily show improvement, but instead remains the same (e.g., cholesterol level does not increase).

Health insurance companies realize benefits for using HCCs as incentives because their subscribers/members/insureds achieve better health, resulting in their using use less health care services overall and using more inexpensive preventive care services while requiring fewer expensive acute, chronic, and emergency care services, all of which reduce costs for the insurer.

Another improvement provided by HCCs is that they monetize improved health outcomes and behaviors as an independent economic value, which opens up a range of uses, including opportunities to earn future health care insurance coverage during present periods when an individual is healthy. For example, young, healthy people, who typically need few if any health care services during their early years of coverage, may be awarded HCCs while young and achieving high levels of good health, and they may save the HCCs for later use, "spend" the HCCs right away, or convert them to cash. For instance, young healthy people, who generally pay much more in health insurance premiums than they incur in health care costs during most of their lives, may exchange HCCs with their insurer immediately to reduce their health care insurance premiums or sell them for cash.

For an example regarding saved HCCs, later in life, when health problems start to affect the formerly young people, they may use saved HCCs to reduce their later, more expensive insurance premiums, or to pay for health care services not covered by insurance. Another advantageous effect of awarding HCCs for healthy behavior in young individuals is an overall reduction in health care treatments throughout the entire health care system as young people are incentivized early on to engage in healthy behaviors, which makes it less likely they will develop medical problems and unhealthy habits later in life.

Another improvement provided by various embodiments of HCC systems is in providing techniques and mechanisms for transferring improved health outcomes between health systems. For example, HCCs earned with one health care insurer may be saved or exchanged and used with a different health care insurer because the health improvements and benefits for an individual, which are represented by the HCCs earned by that individual, remain with the individual, thus reducing costs for a health insurer, regardless of which insurer the individual is contracting with at any particular time.

Yet another improvement provided by various embodiments of HCC systems is in providing techniques and mechanisms for tracking and trading on specific health care treatments and interventions. For example, the data collected, stored, and analyzed in connection with treatments, patient behaviors and activities, and measured health outcomes in order to determine amounts of HCCs to award to each individual patient may be combined with data from many other individuals and analyzed to determine the effects of the health care treatments and interventions on the group. Some embodiments may provide a novel tradable contract or security (e.g., a derivative security) having a value related to the effects of specific health care treatments or interventions.

Health Care Credit Accounts

As noted above and explained in greater detail in the related applications which are incorporated by reference into this application, in various embodiments health care credits are valuable currency-like entities that may be earned for beneficial health-related behaviors and positive and/or improved health-related outcomes. In various embodiments, HCCs may be exchanged for value, for example to offset health insurance premiums, saved for use later, exchanged for either health-related or non-health-related goods or services, gifted, traded or sold through a broker, etc. In most embodiments, accounts are provided to hold, transfer, and exchange HCCs.

FIG. 1 is a block diagram of exemplary health care credit accounts, consistent with the principles of the invention. In the embodiment of a system of accounts 100 shown in FIG. 1, an insurance company or insurance plan 130 may establish and manage a health care provider HCC account 133 and a patient HCC account 136 that are used by a health care provider 110 (e.g., a physician) and a patient 115, respectively. In some embodiments, insurance plan 130 may be a government-sponsored health care insurance program, such as Medicare, Medicaid, Children's Health Insurance Program (CHIP), military health care programs (TriCare), or state health care programs. As discussed in the related applications referenced above, insurance plan 130 may place HCCs in account 133 for HC provider 110 according to data 111 provided by HC provider 110 documenting beneficial health regimens and positive health outcomes related to patient 115 under the care of HC provider 110. Similarly, insurance plan 130 may place HCCs in account 136 for patient 115 according to data 112 provided by HC provider 110 documenting beneficial health regimens and positive health outcomes related to patient 115 under the care of HC provider 110. In the embodiment shown, data 112 is based on data 116 provided HC provider 110 by patient 115.

Accounts 133 and 136 may also received HCCs from sources other than insurance plan 130. For example, as shown in FIG. 1, HCCs may be transferred 151 to accounts 133 and 136 from other sources of HCCs 150, which include sources such as HCC accounts maintained by other insurance companies, HCC brokerage accounts, employers, etc., from which HCCs may be earned, awarded, bought, inherited, gifted, given as an employer match, given as a credit-usage or other promotional reward, or otherwise conveyed.

As shown, a non-insurance entity 140, such as a brokerage, investment firm, bank, or company set up specifically to provide HCC accounts, may establish and manage HCC accounts, such as an individual HCC account 143 and an individual HCC account 146. As shown in this example, a person having no relationship to any insurance company, (such as Individual 120), may nonetheless have a health care credit account, (such as individual HCC account 146). As represented by dashed lines 117 and 121 in the embodiment shown, individual HCC account 143 is controlled by and maintained for patient 117, and individual HCC account 146 is controlled by and maintained for individual 120.

Accounts 143 and 146 may receive/transfer 141 HCCs from/to insurance plan 130 according to the directions of patient 115 and individual 120, respectively. Similarly, accounts 143 and 146 receive/transmit 152 HCCs from/to other sources of HCCs 150 according to the directions of patient 115 and individual 120, respectively.

One of ordinary skill in the art will recognize that system 100 depicted in FIG. 1 is an exemplary, generalized illustration and that components and features may be added to, removed from, or modified within system 100 without departing from the principles of the invention. For one example, patient HCC account 136 may be removed, such that the only account associated with patient 115 is individual HCC account 143, and such that HCCs awarded to patient 115 by insurance plan 130 are deposited directly into individual HCC account 143 by insurance plan 130. For another example, in some embodiments, a single health care account may be provided for a group of individuals (e.g., a family) instead of only a single individual. In such embodiments, positive health behaviors by any member of the group (e.g., eating better and losing weight or reducing BMI by an obese child) may earn HCCs that may be used by other members of the group (e.g., used by a parent of the obese child to reduce the cost of medications).

Figure 2:
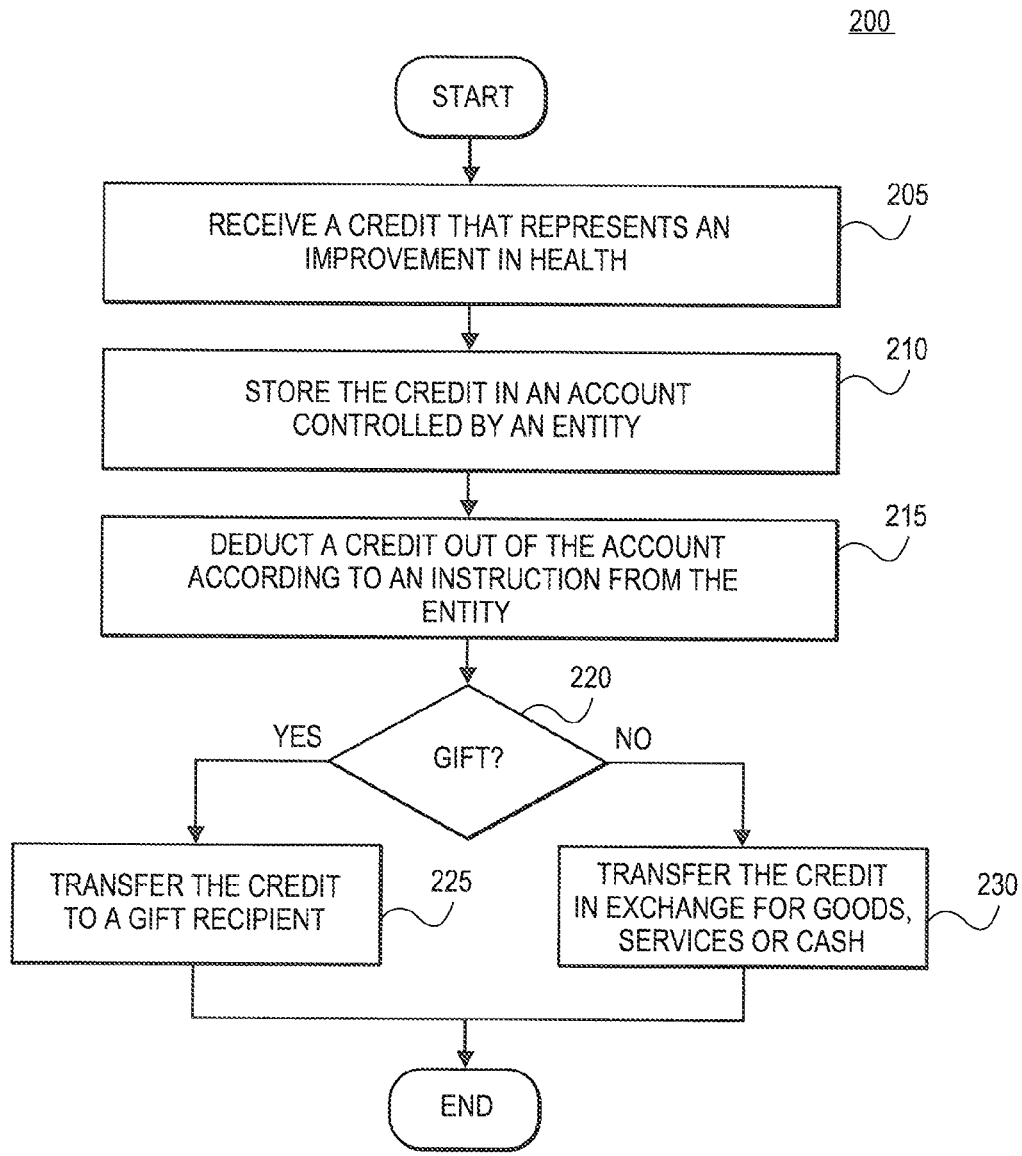
FIG. 2 is a flowchart of an exemplary process for managing a health care credit account, consistent with the principles of the invention.

FIG. 2 is a flowchart of an exemplary process 200 for managing a health care credit account, consistent with the principles of the invention. In some embodiments, process 200 may be implemented using a computing system by an entity functioning as a HCC account provider and/or an HCC account servicer, such as an insurance company 130 or a non-insurance entity 140, as shown in FIG. 1. In the embodiment shown in FIG. 2, process 200 begins with receiving a credit that represents an improvement in health (stage 205), such as an HCC as described previously. In various embodiments, the credit may transferred or transmitted from an HCC account, (such as accounts 133, 136, 143, or 146 of FIG. 1), or the credit may be earned from, or awarded, originated, or created by an entity that seeks to reward and incentivize beneficial health-related behavior and care, such as an insurance company, government agency, or employer. In various implementations of this stage, the credit may be received in the form of electronic signals or electronic digital data.

At stage 210, process 200 stores the credit, which represents an improvement in health, in an account controlled by an entity. In some embodiments, the account may be a health care provider HCC account 133 controlled by an HC provider 110, a patient HCC account 136 controlled by a patient 115, or an individual HCC account 146 controlled by an individual 120, or the like, as shown in FIG. 1. In various embodiments, the entity may be an individual, including an insured individual enrolled in a health insurance plan, or a legal entity, such as a trust, corporation, non-profit organization, etc. In various implementations, the credit may be stored in the form of electronic digital data on a computer readable medium.

At stage 215, process 200 deducts a credit from the account according to an instruction from the entity that controls the account. For one example with reference to FIG. 1, non-insurance entity 140 may deduct a credit(s) from individual HCC account 143 according to an instruction 117 from patient 115, so that the credit(s) can be used to reduce a health insurance premium owed to insurance plan 130. In various implementations, the credit, (which represents an improvement in health), may be deducted by reducing an electronic value representing the amount of HCCs held in the account.

Process 200 next transfers the deducted credit(s) according to the instruction from the entity controlling the account and ends. In the embodiment shown, process 200 first determines whether the credit is a gift (stage 220). If the credit is a gift, (stage 220, Yes), then process 200 transfers the credit to a gift recipient (stage 225), such as to the account of a family member. For example, a healthy husband may transfer credits he has accumulated to the account of his wife who requires an expensive medication whose cost has exceeded the maximum benefit limit of her health insurance policy, allowing the wife to use the credits to offset the continuing cost of the medication. Thus, the wife obtains a benefit from the husband's good health (and corresponding lack of expense to the husband's health insurer) as represented in the form of the husband's health care credits. This is another exemplary improvement over conventional health care systems wherein one individual cannot benefit in any way from another individual's healthy behaviors and outcomes.

If the credit is not a gift, (stage 220, No), then process 200 transfers the credit to an entity that provides, in exchange, goods, services (e.g., a reduction to a health insurance premium), cash, or the like to, or for the benefit of, the entity that controls the account (stage 230). In various implementations, the credit(s), (which represents an improvement in health), may be transferred in the form of electronic signals or electronic digital data.

One of ordinary skill in the art will recognize that process 200 depicted in FIG. 2 is an exemplary, generalized illustration and that stages and features may be added to, removed from, or modified within process 200 without departing from the principles of the invention. For one example, a stage may be added to process 200 wherein deducted credits are removed or disposed of, instead of being transferred to another account, such as in the case where a credit held in an account provided by an insurance company (e.g., patient HCC account 136 provided by insurance company 130), is used to reduce a health insurance premium charged for a policy underwritten by that same insurance company.

Health Care Credit Exchange

As explained in the related applications, various embodiments of health care credit systems award something of value, HCCs, to individuals (patients, insureds, etc.) for beneficial health-related behaviors and outcomes. This is an improvement over conventional health care systems because an individual's health level and health-related behaviors do not significantly financially impact an individual in conventional systems. For example, when an already-insured individual gains weight or ceases to exercise in a conventional health care system, these actions do not significantly increase the individual's premium or significantly reduce some other financial benefit. Conversely, when an already-insured individual reduces their BMI, reduces cholesterol level, or starts an exercise program, these actions do not significantly decrease the individual's premium or increase some financial benefit. Individuals have little incentive to be healthy, because their costs in a conventional system are the same whether they act in a healthy manner or not.

In contrast, health care credit systems consistent with the present disclosure may immediately discourage unhealthy actions by reducing or eliminating the amount of HCCs awarded to the individual. If the individual is using HCCs to reduce their premiums, then this effectively raises their premiums. Moreover, various embodiments may further improve over conventional health care systems by providing exchanges or markets where HCCs may be bought and sold, which effectively allow sellers to convert HCCs into cash. In such embodiments, reducing or eliminating HCC awards discourages unhealthy behaviors because the affected individuals suffer the financial loss of not being able to sell their HCCs for cash on an exchange.

Figure 3:
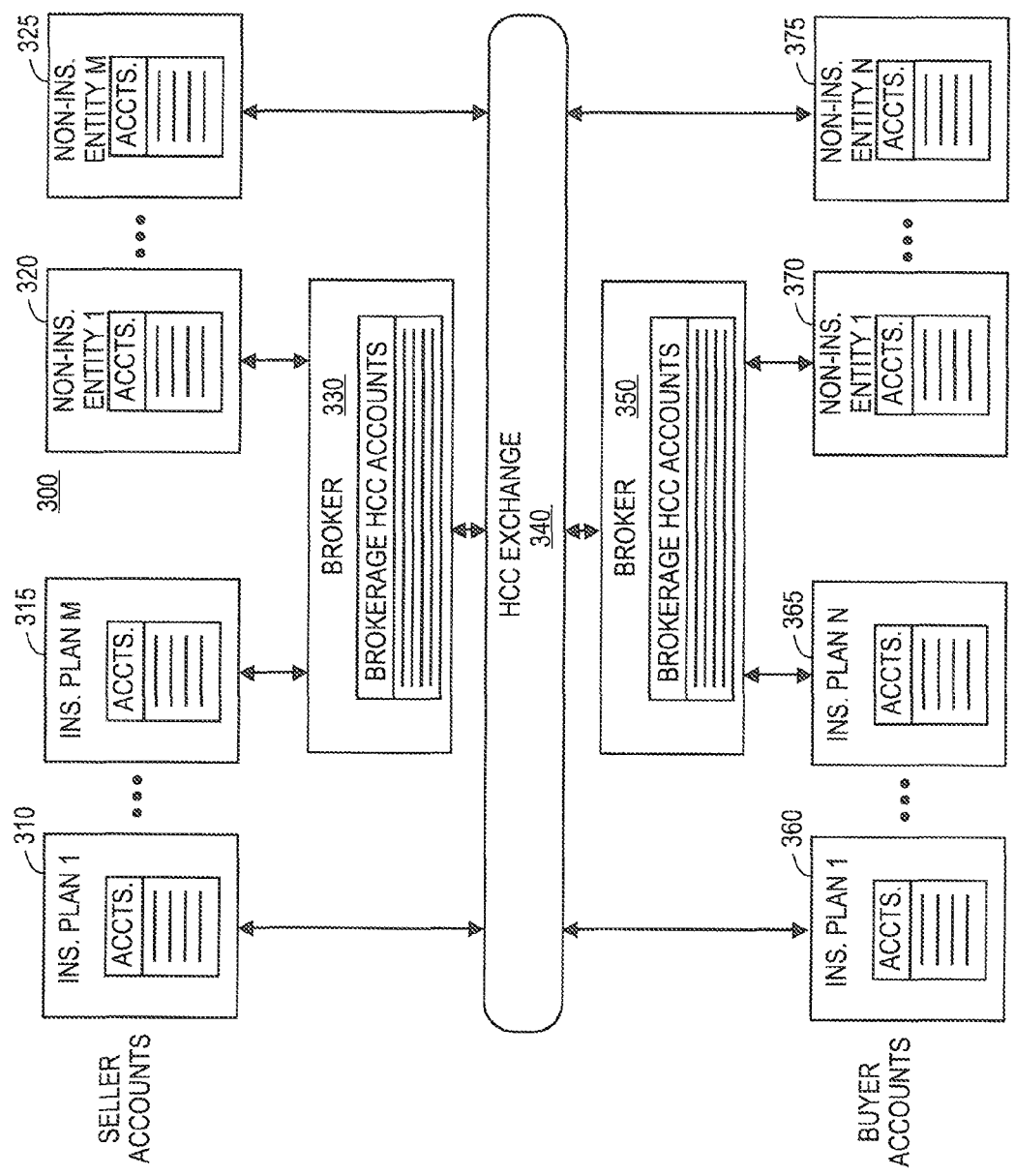
FIG. 3 is a block diagram of an exemplary system for exchanging health care credits, consistent with the principles of the invention.

FIG. 3 is a block diagram of an exemplary system 300 for exchanging health care credits, consistent with the principles of the invention. In the embodiment shown, system 300 includes an HCC exchange 340, which is a market that is designed for the sale and purchase of health care credits issued by an entity or entities. In various embodiments, issuing entities may be health insurance companies, government agencies, or the like. In various embodiments, HCC exchange 340 may sell and buy HCCs and/or securities derived from HCCs. In various embodiments, HCC exchange 340 may be implemented as a computerized market to trade health care credits, which represent an improvement in health. In some embodiments wherein the HCCs issued by different health insurers are essentially the same regardless of issuer, HCC exchange 340 may be implemented in a manner consistent with the NASDAQ™ market for trading stocks. In other embodiments wherein the HCCs issued by different health insurers have different intrinsic values and/or are valued differently depending upon issuer, HCC exchange 340 may be implemented in a manner consistent with the FOREX™ market for trading currencies.

As shown, sellers of HCCs may have HCC accounts provided and maintained by insurance plans 310, 315 and/or by non-insurance entities 320, 325. In some instances, sellers may utilize a broker 330 to interact with HCC exchange 340, for example by transferring HCCs from an insurance plan account 315 or a non-insurance entity account 320 into a brokerage account 330, from which the HCCs may be sold on exchange 340. In various embodiments, brokerage account 330 may also include a cash component for managing money received in exchange for HCC credits.

Similarly, buyers of HCCs may have HCC accounts provided and maintained by insurance plans 360, 365 and/or by non-insurance entities 370, 375. In some instances, buyers may utilize a broker 350 to interact with HCC exchange 340, for example by transferring HCCs or cash from an insurance plan account 365 or a non-insurance entity account 370 (e.g., a bank account) into a brokerage account 350, from which the HCCs may be bought via exchange 340. In various embodiments, brokerage account 350 may include both a cash component for managing money paid in exchange for HCC credits, and an HCC credit component for receiving and storing purchased HCCs.

In various embodiments an individual or entity controlling a buyer account 360-375 may place an order to purchase one or more HCCs by submitting a bid or a request to purchase the HCC to broker 350 or HCC exchange 340 via a computer network or phone line, as is known in the art of exchange trading. The bid order may be logged into a computerized database and matched with an ask, i.e., an offer to sell one or more HCCs by HCC exchange 340, as is known in the art of exchange trading.

In the embodiment shown in FIG. 3, sellers and buyers may also interact directly with HCC exchange 340 without using a broker. As shown, sellers having accounts with an insurance plan 310 or a non-insurance entity 325 may offer HCCs for sale on HCC exchange 340, where the HCCs may be bought by buyers having accounts with an insurance plan 360 or a non-insurance entity 375. In such embodiments, HCC accounts 310, 325, 360, and 375 may include both a cash component for managing money paid/received in exchange for HCC credits, and an HCC credit component for transmitting, receiving and/or storing purchased HCCs. In some such embodiments, HCC exchange 340 may be implemented as a computerized online trading platform for HCC, which represent an improvement in health, in a manner consistent with the eBay™ trading platform.

In various embodiments, HCCs purchased or received by individual(s), such as the owners of buyer accounts 360-375, may be utilized by the individual(s) to fully or partially pay for health-care related services and goods in lieu of cash or insurance. For example, if an individual determines or is advised that he or she requires medical care, where the cost of the medical care is not covered in full or in part by the individual's insurance plan, then the individual may purchase HCCs on an HCC exchange and use the HCCs to pay for the medical care. Or, an individual may choose to utilize HCCs to pay for medical care in lieu of insurance in order to gain some other benefit, such as avoiding an increase in insurance premiums.

One of ordinary skill in the art will further recognize that system 300 depicted in FIG. 3 is an exemplary, generalized illustration and that components and features may be added to, removed from, or modified within system 300 without departing from the principles of the invention. For example, one of ordinary skill will recognize that seller accounts 310, 315, 320, 325 may also be used to buy HCCs on HCC exchange 340, and similarly buyer accounts 360, 365, 370, 375 may also be used to sell HCCs on HCC exchange 340. For another example, one of ordinary skill will also recognize that seller accounts 310, 315, 320, 325 and buyer accounts 360, 365, 370, 375 are not limited to being owned or controlled only by individual persons. In some embodiments HCC accounts may be owned or controlled by corporations or other legal entities, which may, for example, wish to purchase HCCs that can be awarded to their employees.

Figure 4:
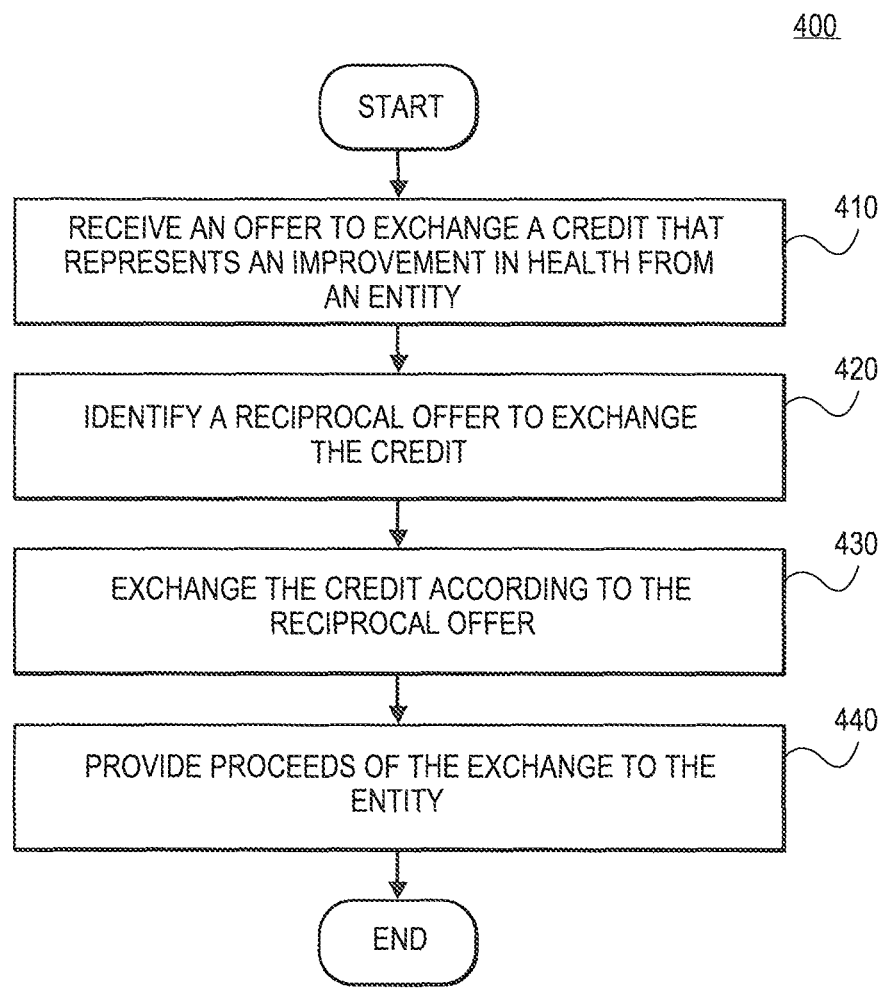
FIG. 4 is a flowchart of an exemplary process for exchanging health care credits, consistent with the principles of the invention.

FIG. 4 is a flowchart of an exemplary process 400 for exchanging health care credits, consistent with the principles of the invention. In some embodiments, process 400 may be implemented using a computing system by an entity providing a market to buy and/or sell HCCs, such as HCC exchange 340, as shown in FIG. 3. In the embodiment shown in FIG. 4, process 400 begins with receiving, from an entity, an offer to exchange a credit(s) that represents an improvement in health, (e.g., an HCC). For example, the offer may be an offer to sell an HCC for a specified minimum amount of cash, an offer to buy an HCC for a specified maximum amount of cash, an offer to sell an HCC for the current market price, an offer to buy an HCC for the current market price, or an offer to swap a specified quantity of one type of HCC for a specified quantity of another type of HCC, (e.g., swap 1.0 HCC issued by Blue Cross Blue Shield for 2.5 HCCs issued by Medicare). In various embodiments, the entity may be an individual that has an HCC account, such as HCC accounts 310, 325 or brokerage account 330. In various implementations, the offer to exchange a credit(s) may be received in the form of electronic signals or electronic digital data representing a buy order or a sell order.

At stage 420, process 400 identifies a reciprocal offer(s) to exchange the credit that represents an improvement in health. For example, if process 400 has received an offer to sell 100 HCC for $1.00 each at stage 410, stage 420 may identify one or more offers to buy 100 HCC for at least $1.00 each. In various embodiments, the identification of a reciprocal offer(s) may be implemented by a computing system that matches buy and sell orders according to price, quantity, and other factors.

In various implementations, there may be no reciprocal offer that matches a newly received offer to exchange HCCs and/or the offer to exchange may be an offer to buy or sell HCCs at the current market price. In either case, stage 420 may determine that the appropriate reciprocal offer is a pending offer that is nearest to the price desired by the entity, or the pending offer that is nearest in price to the last completed exchange of the same type of HCC credit (e.g., the last completed trade on a HCC exchange 340).

In some embodiments, HCCs created by different health insurers may have different characteristics, which may cause them to have different values from each other, intrinsically and/or according to their market prices on a market administered by an HCC exchange 340 implementing process 400. For example, consider the case where a first insurer, for instance TriCare insurance, awards HCCs to its insureds such that 100 TriCare HCCs may be exchanged for a $100 reduction in an insured's TriCare insurance premium, and/or exchanged for goods and services from vendors that TriCare has contracted with at a rate of one dollar per TriCare HCC. Consider further a second HCC insurer, for instance Kaiser Permanente™, that awards HCCs to its insureds such that 100 Kaiser HCCs may be exchanged for a $50 reduction in an insured's Kaiser insurance premium and/or exchanged for goods and services from vendors that Kaiser has contracted with at a rate of 75 cents per Kaiser HCC. In some such embodiments, there may also be differences in how many HCCs each insurer awards for the same or similar healthy outcomes or actions by its insureds. Competing insurers may use these and other characteristics of their HCC programs to attract customers.

In such a case, the best reciprocal offer on the market identified by stage 420 for exchanging Kaiser HCCs for Tri-Care HCCs may be an offer to exchange 1.5 Kaiser HCCs for 1 TriCare HCC, or to exchange 2.0 Kaiser HCCs for 1 TriCare HCC, both of which reflect the relative intrinsic values of the HCCs. Or, the exchange rate on the market may vary greatly from the relative intrinsic values of the HCCs due to the relative supply and demand of the two types of HCCs in this example. Similarly, individuals offering to sell the two types of HCCs for cash may be subject to the price set by the market based on supply and demand for each of the two types of HCCs, analogous to foreign currency exchanges.

In other embodiments, HCCs created by different health insurers may have substantially uniform characteristics, regardless of the insurer that issued them. For example, all insurers may allow their insureds to exchange their HCCs on a one-to-one dollar basis for a reduction in a health insurance premium. In some such embodiments, HCCs may be fungible when traded on a market administered by an HCC exchange 340 implementing process 400. In such embodiments, the primary type of market transaction may be exchanging HCCs for cash, where the reciprocal offers (stage 420) are at a price determined by the market based on supply and demand for HCCs overall, analogous to stock exchanges wherein an HCC is a security like a share of stock.

As shown in the embodiment of FIG. 4, process 400 next exchanges the credit according to the reciprocal offer (stage 430). Continuing the previous example with respect to this stage, process 400 may deduct 100 HCC from the account (e.g., insurance-plan-managed account 310, non-insurance-entity-managed account 325, or brokerage account 330) of the entity that submitted the sell offer for 100 HCC at $1.00 each, and deduct $100 for the account(s) (e.g., insurance-plan-managed account 360, non-insurance-entity-managed account 375, or brokerage account 350) of the entity(ies) that submitted the reciprocal buy offer(s) of $100 for 100 HCC.

Process 400 then provides the proceeds of the exchange to the entity that transmitted the original offer (stage 440) and then ends. Again continuing the previous example, process 400 may transmit the $100 deducted from the account(s) of the entity(ies) that submitted the reciprocal buy offer(s) of $100 to the entity that transmitted the original sell offer referenced in stage 410.

One of ordinary skill in the art will recognize that process 400 depicted in FIG. 4 is an exemplary, generalized illustration and that stages and features may be added to, removed from, or modified within process 400 without departing from the principles of the invention. For example, a stage may be added to process 400 wherein the proceeds of the exchange are provided to the entity associated with the reciprocal offer (e.g., the buyer that fills a sell order is provided with the HCCs that were purchased).

Health Care Tracking Data and Derivatives

Health care credit systems consistent with the present disclosure provide improved health data gathering and management, which fits well with evidence-based health care practices, and has other novel uses. In various embodiments, to determine whether and how many HCCs to award to individuals, insurers or other HCC administrators or awarders analyze health care data provided by the treating health care provider (e.g., physician). In some embodiments, this same data may be used for various other purposes in addition to administering HCC awards.

For example, the health care data may be used to track over time and evaluate health care treatment regimens and outcomes, including with respect to specific demographic patient groups. Such tracking data may be used to identify marginally effective and ineffective treatment regimens and discourage their use among health care providers, which would provide another improvement over current health care system wherein health care providers are often rewarded based on the amount of treatments they provide (i.e., they are paid per treatment), regardless of effectiveness. In some embodiments, such tracked information may be used as the basis for a derivative security having a value that is directly related to a specific health care outcome and that provides a novel way to monetize health care treatments.

Figure 5:
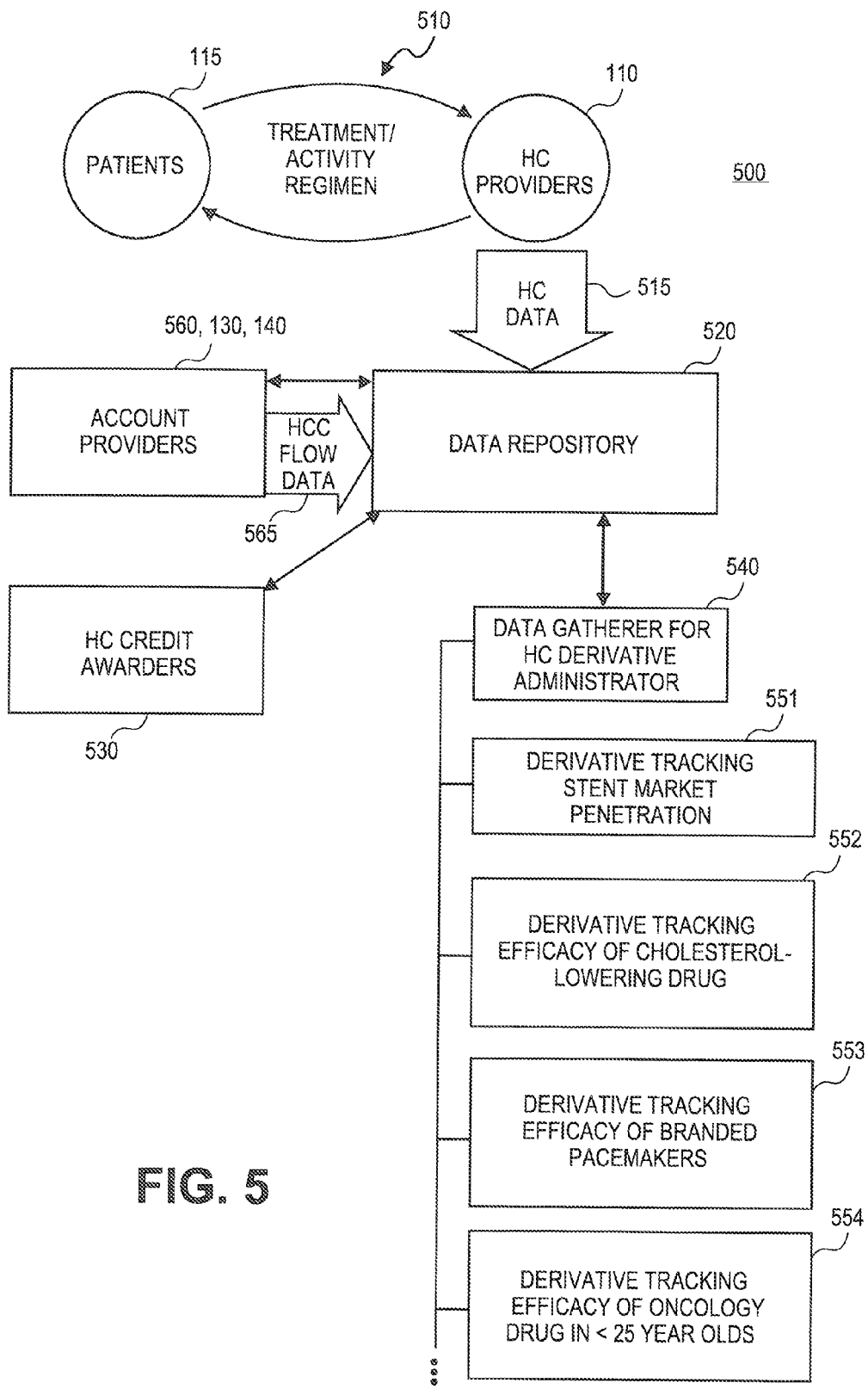
FIG. 5 is a block diagram illustrating an exemplary system for managing data and providing derivative securities related to health care information, consistent with the principles of the invention.

FIG. 5 is a block diagram illustrating an exemplary system 500 for managing data and providing health care derivative securities related to health care information, consistent with the principles of the invention. In various embodiments, a health care derivative may be a security whose price or value is dependent upon or derived from one or more underlying "assets," where the assets are in the form of accurate, current information relating to health care problems, treatments, outcomes, effectiveness, usages, and the like. In some embodiments, the derivative itself may simply be a contract between two or more parties that specifies its value at a future date dependent upon condition(s) of the underlying information. The value of a derivative at any point in time before its expiration is determined by fluctuations in the underlying data with respect to desired conditions—in this case by the changes and content of the underlying health care data—and the market demand. In various embodiments, a health care derivative may be tradable on an exchange or over the counter.

As shown in the embodiment of FIG. 5, health care providers 110 may implement a treatment regimen or health care activity regimen 510 with patients 115, as described in more detail in the related applications.

As the treatment regimen 510 is ongoing, health care provider 110 gathers health care data 515 documenting the patient 115, the health characteristics and/or problem(s), the treatment(s), the outcome(s), etc. In various embodiments, data documenting the patient may include information regarding characteristics such as race, sex, age, height, weight, address, occupation, family history, habits, social history, and the like. In various embodiments, data documenting the patient's health characteristics or problems may include information describing the problem(s) currently being treated (heart disease, cancer, broken bone, migraine headaches, high cholesterol, high BMI, etc.) including baseline and continuing measurements (e.g., artery blockage measurements, tumor size and growth, fracture healing, headache frequency and intensity, blood pressure, cholesterol level, etc.), and the like. In various embodiments, data documenting the patient's treatment regimen may include information describing medications and usages, surgeries or other procedures, appliances used (e.g., stents, etc.), therapy routines, diet, exercise, and the like. In various embodiments, data documenting the patient's outcome(s) may include information describing the result of each treatment, for example, cured, artery blood flow increased 70%, fracture 50% healed, headache frequency reduced 10%, cholesterol lowered by 30%, and the like.

As shown in the embodiment of FIG. 5, health care provider 110 provides health care data 515 to a data repository 520. In various embodiments, data repository 515 may be implemented by a database server or other computing system for maintaining and accessing data.

As shown, account providers 560, such as insurance plan 130 or non-insurance entity 140, also provide data to data repository 520, such as health care credit flow data 565. In some embodiments, health care credits flow data 565 includes information describing transfers of HCCs from one account to another and describing the accounts involved, as well as information regarding HCCs exchanged for goods, services, etc., and the entities involved. In such embodiments, health care credits flow data 565 may indicate, for example, the amount of HCCs that are being sold for cash, the amount of HCCs that are being exchanged for goods and services of contracted vendors, the amount of HCCs that are being exchanged for insurance premium reductions, and the like.

Also as shown, health care credit awarders 530 are connected to, and may access, the data in data repository 520. In various embodiments, health care credit awarders 530 include insurance plans/companies 130, which may award HCCs to individuals, such as patients 115, as an incentive to act in a health-beneficial manner and for achieving positive health outcomes, as explained in detail in the related applications. Health care credit awarders 530 may read and analyze HC data 515 stored in data repository 520 to determine whether patients 114 have engaged in rewardable activities and/or have achieved positive health outcomes. In various embodiments, health care credit awarders 530 may also read and analyze HC data 515 stored in data repository 520 to determine whether HC providers 110 (e.g., physicians) have engaged in rewardable activities (e.g., provided effective treatment regimens to patients 115) and/or achieved positive health outcomes for patients.

In some embodiments where health care credit awarders 530 are insurance companies, they may read and analyze HC data 515 stored in data repository 520 to determine which treatments and regimens produce beneficial results for patients, and which do not, or are less effective than others. This information, in turn, may inform policy coverage decisions by an insurer. For example, an insurer may remove coverage (i.e., not reimburse) for a drug that is not working, according to the information in HC data 515, or an insurer may refuse to cover implantation of a certain, more-expensive brand of pacemaker, if that pacemaker does not achieve results superior to a less expensive brand, according to the information in HC data 515.

In the embodiment shown, a HC derivate administrator 540 is also connected to, and may access, the data in data repository 520. In various embodiments, HC derivate administrator 540 may create, issue, administer, sell, and/or buy HC derivatives whose performance and value are based on underlying HC data 515. As noted above, HC derivatives may be embodied as securities or contracts that track health care outcomes. In an investment sense, HC derivatives provide a far more granular and precise way to invest in and trade on differentiated health care devices, medications, treatments, techniques, etc., in comparison to health care stocks. HC derivatives also provide the opportunity for brokerages and investment houses to create futures and options trades based on underlying health care devices, medications, treatments, techniques, etc.; i.e., futures and options based on the predicted value of a HC derivative.

In the embodiment shown, HC derivative administrator 540 has created and is managing four exemplary derivatives 551-554. HC derivatives 551-554 may be designed and implemented to achieve almost any financial objective based on underlying health care information. In general, HC derivatives may be designed and implemented to provide a profit or payout if specific health-related characteristics and events, as indicated by the underlying HC data 515, turn out to be the way the issuer expects (e.g., move in a given direction, stay in or out of a specified range, reach a certain level or goal, etc.).

For example, HC derivative 551 may be designed to provide leverage related to the market penetration of a specific stent, such that a small market penetration as tracked and indicated by the underlying HC data 515 (e.g., 2% of all stents used will be ACME Corp. model 123A stents 18 months from now), will cause a large difference in the value of HC derivative 551 (e.g., derivative 551 will pay 30 times its issue price in 18 months if the market penetration goal is reached; and otherwise it will be worthless).

For another example, HC derivative 552 may track the efficacy of a new cholesterol lowering drug in African American males, as documented and indicated by the underlying HC data 515, and provide a payout such that, after 12 months of usage, if the new drug lowers overall cholesterol an average of 0-10% in the African American male demographic group, then HC derivative 552 pays nothing; if the new drug lowers overall cholesterol an average of 10.1-25%, then derivative 552 pays 1.5 times its purchase price; if the new drug lowers overall cholesterol an average of 25.1-50%, then derivative 552 pays 2.5 times its purchase price; and if the new drug lowers overall cholesterol an average of 50.1% or more, then HC derivative 552 pays 4 times its purchase price.

For another example, HC derivative 553 may be designed to track the efficacy of two specific brands of pacemakers relative to each other, as indicated by the underlying HC data 515, such that, after 24 months of usage, if Brand A pacemakers have required fewer repairs, adjustments, and replacements than Brand B pacemakers, then the derivative pays three times its purchase price, and otherwise, it pays nothing.

For yet another example, HC derivative 554 may be designed to track the efficacy of a specific oncology drug in a specific age demographic relative to another age demographic, as indicated by the underlying HC data 515, such that, after 24 months of treatment with the oncology drug, if the remission rate for patients 25 years old and younger is 0-15% higher than the remission rate for patients older than 25 years, then the derivative pays nothing; and if the remission rate for patients 25 years old and younger is 15.1% or more higher than the remission rate for patients older than 25 years, then the derivative three pays times its purchase price.

One of ordinary skill in the art will recognize that system 500 depicted in FIG. 5 is an exemplary, generalized illustration and that components and features may be added to, removed from, or modified within system 500 without departing from the principles of the invention. For example, one of ordinary skill will recognize that the examples of HC derivatives 551-554 are illustrative only, and many other health care derivatives are possible within the scope of the invention, including health care derivatives whose payouts are expressed in terms other than as a multiple of the purchase price. For another example, system 500 may be modified so that third parties (not shown), including additional HC derivative creators and insurance companies, may be connected to data repository 520 and allowed to access, mine, and analyze HC data 515 for various purposes, including creating additional HC derivatives and shaping health insurance coverages.

Figure 6:
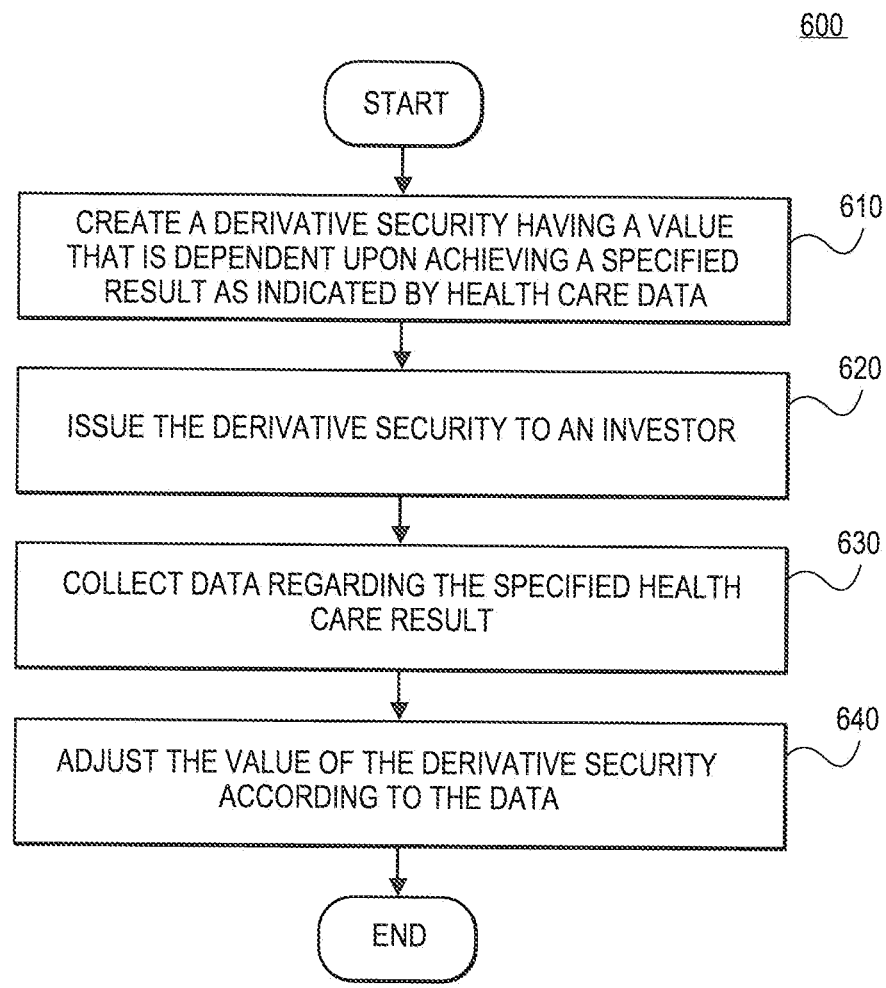
FIG. 6 is a flowchart of an exemplary process for managing a derivative security related to health care credits, consistent with the principles of the invention.

FIG. 6 is a flowchart of an exemplary process 600 for managing a derivative security related to health care and/or health care credits, consistent with the principles of the invention. In some embodiments, process 600 may be implemented using a computing system by an entity that is creating and/or managing derivatives that are based on health care treatment and outcome data, such as HC derivative administrator 540, as shown in FIG. 5. In the embodiment shown in FIG. 6, process 600 begins with creating a derivative security having a value that is dependent upon achieving or fulfilling a specified result or condition as indicated by health care data (stage 610). For example, as noted above with respect to FIG. 5, HC derivatives (such as HC derivatives 551-554) may be created such that they increase or decrease in value, or pay out a specified amount, if specific health-related characteristics and events, as indicated by the underlying HC data 515, turn out to be the way the derivative creator expects (e.g., move in a given direction, stay in or out of a specified range, reach a certain level, etc.). In other words, the value of a HC derivative may be tied to a condition(s) that is discernable from health care data and HCC flow data that is generated and collected incidental to providing health care services to individuals and/or tied to whether/how that condition(s) is fulfilled or achieved. In various embodiments, creating the derivative may include specifying a definite time(s) for achieving the specified result(s) and specifying a definite payout(s) if the specified result(s) are achieved at the specified time(s).

At stage 620, process 600 issues the derivative security to an investor(s). In some embodiments, this stage may be implemented by selling or trading the HC derivative security either on a regulated exchange, such as the Chicago Board of Trade, on a custom HC exchange, such as HC 340 of FIG. 3, or off the exchanges, directly between the different counterparties.

Next, process 600 collects data regarding the specified health care result that underlies the derivative (stage 630). In various embodiments, the data collection of stage 630 may be ongoing over the life of the derivative, as new health care data regarding relevant treatments, outcomes, etc. is generated by patients and health care providers over time. In some embodiments, stage 640 may be implemented by retrieving data from data repository 520, as shown in FIG. 5.

At stage 640, process 600 adjusts the value of the derivative security according to the data collected in stage 640 and then ends. For derivatives that feature a final payout at a specified ending date, this stage may involve analyzing the health care data collected in stage 630 as of the final payout date and determining whether, or which, payout conditions were met. For example, consider again the example of HC derivative 551 discussed above with respect to FIG. 5, wherein the derivative was created to pay 30 times its issue price if 2% of all stents used are ACME Corp. model 123A stents during a period ending 18 months after creation of HC derivative 551. In this example, stage 640 involves accessing and analyzing HC data 515 to determine the total number of stents employed during the relevant 18 month period and the number of ACME Corp. model 123A stents among that total. Then, stage 640 calculates whether the number of model 123A stents is equal to or greater than 2% of the total, and if so, adjusts the values of HC derivative 551 to be 30 times its issue price. Or, if the calculation shows the number of model 123A stents is less than 2% of the total, then stage 640 adjusts the value of HC derivative 551 to be zero.

In various embodiments, stage 640 may also include calculating and adjusting the current value of a derivative at a time before the final payout date, using either a formula based on the progress to date toward the specified payout goal(s), or by letting the market set the value according to the bids and offers from buyers wishing to purchase the derivative. Other ways of adjusting the value are also possible, within the scope of the invention.

One of ordinary skill in the art will recognize that process 600 depicted in FIG. 6 is an exemplary, generalized illustration and that stages and features may be added to, removed from, or modified within process 600 without departing from the principles of the invention. For example, a stage may be added to process 600 wherein the adjusted value of the derivative security is paid to holders of the derivative, as of the final payout date.

Health Care Credit Flows Derivatives

As explained in the related applications, which are incorporated by reference, in various embodiments, HCCs are transferable between a wide range of entities. Although HCCs may be created and awarded by different creating entities (e.g., by different insurance companies), in various embodiments, each creating entity honors HCCs created by another creating entity and/or the HCCs of different creating entities may be exchanged for each other, or bought and sold with cash, on exchanges or other marketplaces.

Figure 7:
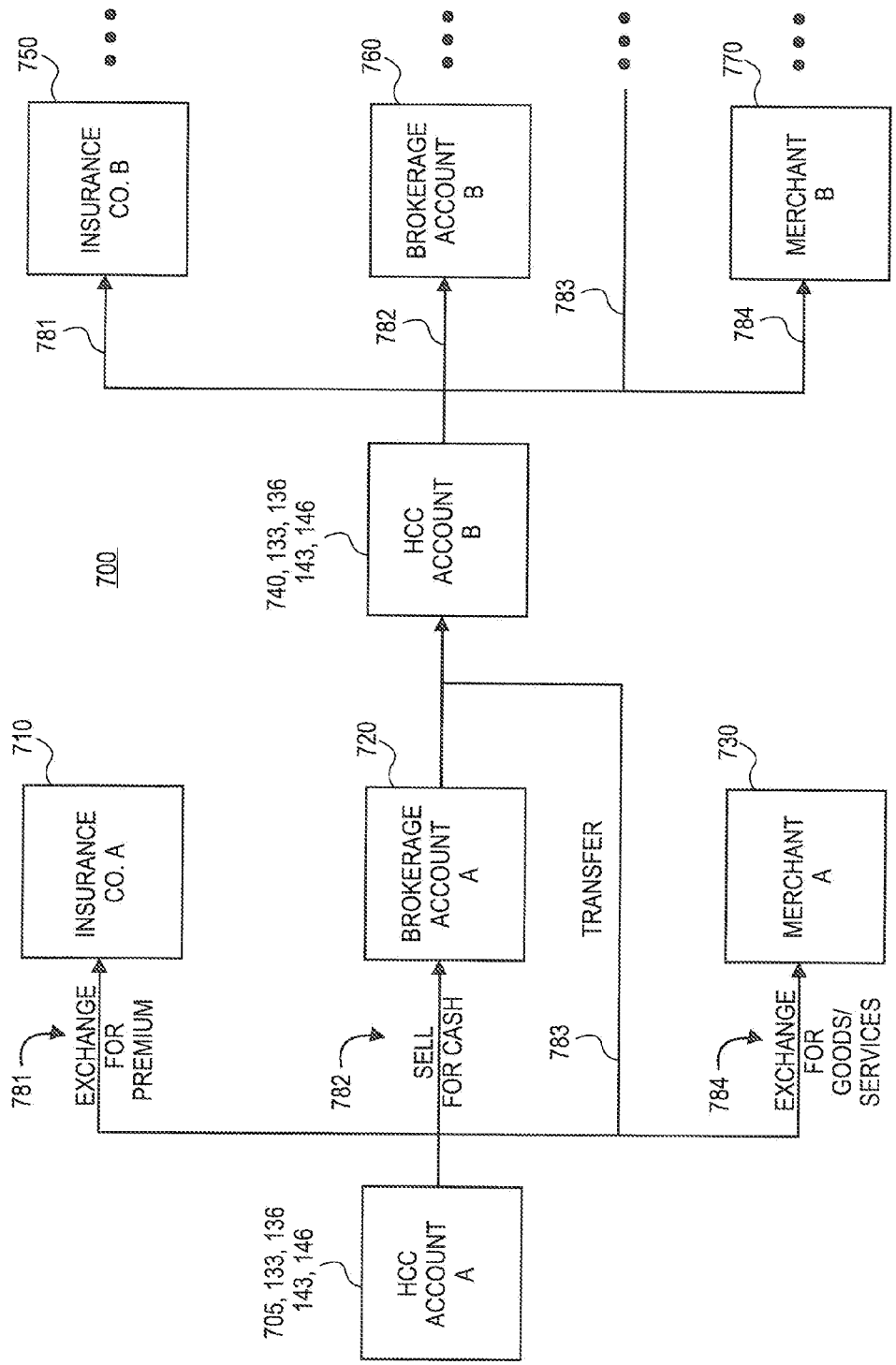
FIG. 7 is a block diagram showing an exemplary system for transferring and exchanging health care credits, consistent with the principles of the invention.

FIG. 7 is a block diagram showing an exemplary system 700 for transferring and exchanging health care credits, consistent with the principles of the invention. In the embodiment shown, HCC account A 705 contains HCC credits. HCC account A 705 may be, for example, a health care provider HCC account 133, a patient HCC account 136, or an individual HCC account 143 or 146.

The entity controlling HCC account A 705, such as an individual who has been awarded HCCs from his health insurer for achieving positive health outcomes, may freely transfer the HCCs to other entities in the HCC system 700. For example, an individual may transfer 781 HCCs from HCC account A 705 to a health insurance company A 710 in exchange for a reduction in the premium paid by the individual for health insurance.

Similarly, the individual may transfer 784 HCCs from HCC account A 705 to a merchant A 730 in exchange for goods and/or services provided by merchant A 730. In some embodiments, merchant A 730 may have contracted with health insurance company A 710 (or other entity creating or backing HCCs) to accept HCCs from customers in lieu of cash, with the arrangement that health insurance company A 710 will compensate merchant A 730 with cash for the accepted HCCs. In other embodiments, merchant A 730 may have no contract with health insurance company A 710, and may simply sell received HCCs for cash in a market such as HCC exchange 340 as described above with respect to FIG. 3. Other arrangements may also be used.

The controlling individual may also transfer 782 HCCs from HCC account A 705 to a brokerage account A 720, and then sell them for cash from brokerage account A 720 on a market such as HCC exchange 340 as described above with respect to FIG. 3.

As also shown in the embodiment of FIG. 7, the controlling individual may also directly transfer 783 HCCs from HCC account A 705 to an HCC account B 740, which may be, for example, a health care provider HCC account 133, a patient HCC account 136, or an individual HCC account 143 or 146. For instance, the controlling individual may transfer 783 HCCs as a gift to an account belonging to a family member.

As represented by the pathways 781, 782, 783, and 784 emanating from HCC account B 740, the entity controlling HCC account B 740 may similarly exchange, sell, or transfer the credits in the account for a variety of purposes. Thus, in various embodiments, HCCs are freely transferable among the accounts and entities of HCC system 700.

One of ordinary skill in the art will recognize that system 700 depicted in FIG. 7 is an exemplary, generalized illustration and that components and features may be added to, removed from, or modified within system 700 without departing from the principles of the invention. For example, one of ordinary skill will recognize that any number of merchants, insurance companies, brokerage accounts, individual accounts, exchanges, etc. may be added to system 700 without departing from the principles of the invention.

As exhibited by system 700, embodiments that report and store HCC account data may track the flow of HCCs throughout system 700, as each account records HCC transfers into and out of the account. And, there may be useful meanings attributed to each HCC transfer or flow. For example, HCC flows into certain accounts may indicate healthy people earning credits, HCC flows out of certain accounts may indicate people who require little health care are selling credits or exchanging credits for good and services, HCC flows into and out of other specific accounts may indicate unhealthy people buying credits and using them for healthcare services, etc.

Moreover, information regarding flow trends and quantities of HCCs being transferred to and/or from certain entities, such as to specific vendors (e.g., American Airlines or Wal-Mart), may be significant to investors who wish to make investments based on anticipated effects, or the predictive qualities, of the HCC flows.

Figure 8:
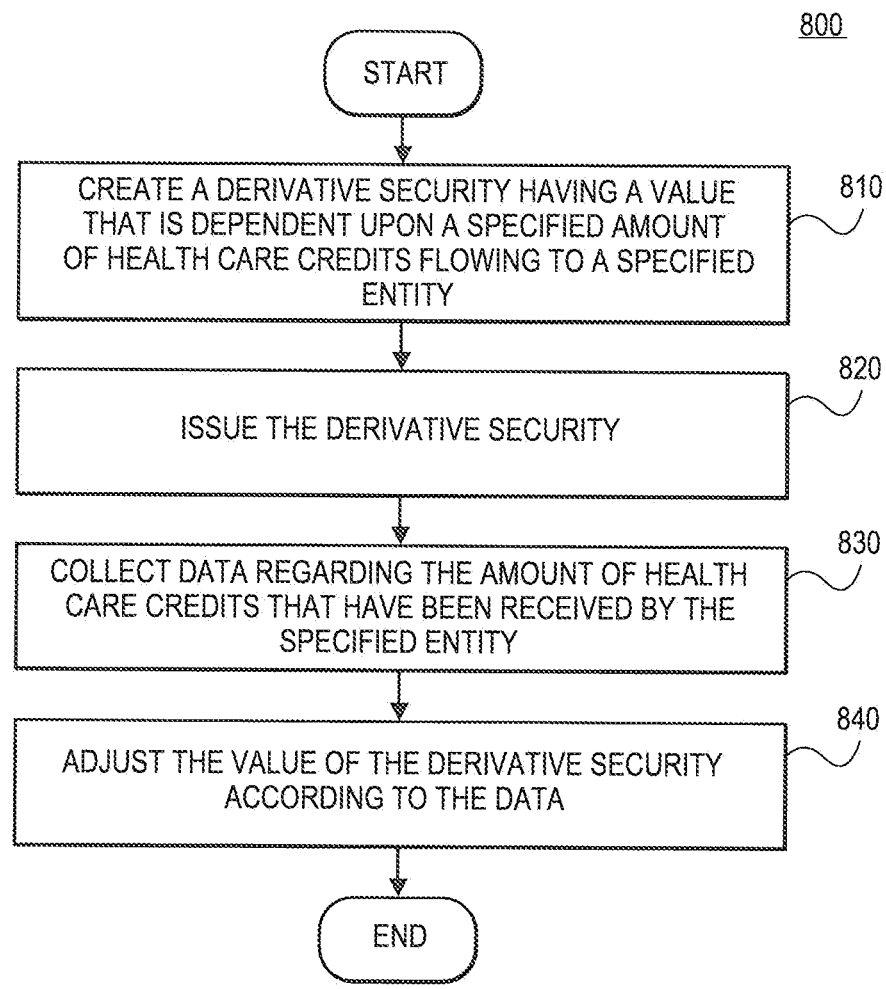
FIG. 8 is a flowchart of an exemplary process for managing a derivative security related to the transfer of health care credits, consistent with the principles of the invention.

FIG. 8 is a flowchart of an exemplary process 800 for managing a derivative security related to health care credits consistent with the principles of the invention, and in particular a derivative related to the flow of credits from and to various entities. In various embodiments, process 600 may be implemented using a computing system by an entity that is creating and/or managing derivatives that are based on health care treatment and outcome data, such as HC derivative administrator 540, as shown in FIG. 5.

In the embodiment shown in FIG. 8, process 800 begins with creating a derivative security having a value that is dependent upon a specified amount of health care credits flowing to a specified entity (stage 810). For example, HC derivatives (similar to HC derivatives 551-554 of FIG. 5) may be created that increase in value, or pay out a specified amount, if a specified amount of HCCs flow into/out of the account(s) of a specified entity(ies), as indicated by the underlying HC data 515. In various embodiments, creating the derivative may include specifying a definite time(s) for achieving the specified amount(s) flowing to the specified entity(ies) or account(s), and specifying a definite payout(s) if the specified amount(s) are achieved at the specified time(s).

At stage 820, process 800 issues the derivative security to an investor(s). In some embodiments, this stage may be implemented by selling or trading the HC derivative security either on a regulated exchange, such as the Chicago Board of Trade, on a custom HC exchange, such as HC 340 of FIG. 3, or off the exchanges, directly between the different counterparties.

Next, process 800 collects data regarding the amount of HCCs that have been received (or transmitted) by the specified entity(ies), which are the HCC flow(s) that underlies the derivative (stage 830). In various embodiments, the data collection of stage 830 may be ongoing over the life of the derivative, as new HCC flow data 565 is generated by account providers 560 over time. As shown in FIG. 5, process 800 may collect the relevant data by accessing data repository 520, which stores the HCC flow data 565 placed there by account providers 560.

At stage 840, process 800 adjusts the value of the derivative security according to the data collected in stage 840 and then ends. For HCC flow derivatives that feature a final payout at a specified ending date, this stage may involve analyzing the HCC flow data 565 collected in stage 830 as of the final payout date and determining whether or which payout conditions were met, in a manner similar to that described with respect to stage 640 of FIG. 6. For example, the value of a HCC flow derivative may be tied to a condition(s) that is discernable from health care data and HCC flow data that is generated and collected incidental to providing health care services and HCC transaction services to individuals and/or tied to whether/how that condition(s) is fulfilled or achieved.

In various embodiments, stage 840 may also include calculating and adjusting the current value of a HCC flow derivative before the final payout date, using either a formula based on the progress to date toward the specified payout goal(s), or by letting the market set the value according to the bids and offers from buyers wishing to purchase the derivative.

One of ordinary skill in the art will recognize that process 800 depicted in FIG. 8 is an exemplary, generalized illustration and that stages and features may be added to, removed from, or modified within process 800 without departing from the principles of the invention. For example, a stage may be added to process 800 wherein the adjusted value of the derivative security is paid to holders of the derivative, as of the final payout date.

HCC Computing Systems

Figure 9:
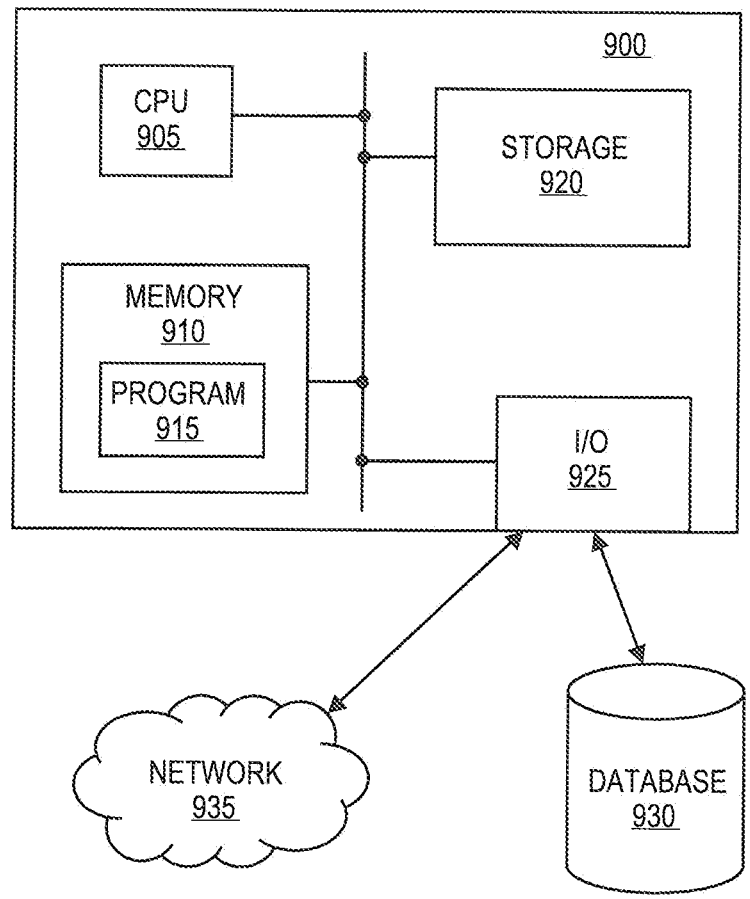
FIG. 9 is a block diagram illustrating an exemplary computing system suitable for implementing embodiments consistent with the principles of the invention.

FIG. 9 is a block diagram illustrating an exemplary computing system 900 suitable for implementing embodiments consistent with the principles of the invention. Other components and/or arrangements may also be used. In various embodiments, computing system 900, or several communicatively connected instances of computing system 900, may be used to implement processes 200, 400, 600, 800, 1200, 1500, 1600, 1700, and 1800, as well as HCC accounts, HCC exchange 340, and/or HC derivative administrator 540, among other things.

Computing system 900 includes a number of components, such as a central processing unit (CPU) 905, a memory 910, an input/output (I/O) device(s) 925, and a nonvolatile storage device 920. System 900 can be implemented in various ways. For example, an implementation as an integrated platform (such as a workstation, server, personal computer, laptop, smartphone, etc.) may comprise CPU 905, memory 910, nonvolatile storage 920, and I/O devices 925. In such a configuration, components 905, 910, 920, and 925 may connect and communicate through a local data bus and may access a database 930 (implemented, for example, as a separate database system) via an external I/O connection. I/O component(s) 925 may connect to external devices through a direct communication link (e.g., a hardwired or local wifi connection), through a network, such as a local area network (LAN) or a wide area network (WAN), and/or through other suitable connections. System 900 may be standalone or it may be a subsystem of a larger system.

CPU 905 may be one or more known processing devices, such as a microprocessor from the Core™ 2 family manufactured by the Intel™ Corporation of Santa Clara, Calif. Memory 910 may be one or more fast storage devices configured to store instructions and information used by CPU 905 to perform certain functions, methods, and processes related to embodiments of the present invention. Storage 920 may be a volatile or non-volatile, magnetic, semiconductor, tape, optical, or other type of storage device or computer-readable medium, including devices such as CDs and DVDs, meant for long-term storage.

In the illustrated embodiment, memory 910 contains one or more programs or subprograms 915 loaded from storage 920 or from a remote system (not shown) that, when executed by CPU 905, perform various operations, procedures, processes, or methods consistent with the present invention. Alternatively, CPU 905 may execute one or more programs located remotely from system 900. For example, system 900 may access one or more remote programs via network 935 that, when executed, perform functions and processes related to embodiments of the present invention.

In one embodiment, memory 910 may include a program(s) 915 that implements processes 200 and/or 400, processes 600 and/or 800 and/or processes 1200, 1500, 1600, 1700, and 1800. In some embodiments, memory 910 may also include other programs or applications that implement other methods and processes that provide ancillary functionality to the invention. For example, memory 910 may include programs that gather, organize, store, and/or provide access to health care related data, such as HC data 515, HCC flow data 565, HCC account data, data indicative of a health metric or a behavior affecting health, etc.

Memory 910 may be also be configured with other programs (not shown) unrelated to the invention and/or an operating system (not shown) that performs several functions well known in the art when executed by CPU 905. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 925 may comprise one or more input/output devices that allow data to be received and/or transmitted by system 900. For example, I/O device 925 may include one or more input devices, such as a keyboard, touch screen, mouse, and the like, that enable data to be input from an administrative user, such as a system operator, or an application user. Further, I/O device 525 may include one or more output devices, such as a display screen, CRT monitor, LCD monitor, plasma display, printer, speaker devices, and the like, that enable data to be output or presented to a user. I/O device 925 may also include one or more digital and/or analog communication input/output devices that allow computing system 900 to communicate, for example, digitally, with other machines and devices, including client devices (e.g. users' desktop or laptop computers). Other configurations and/or numbers of input and/or output devices may be incorporated in I/O device 925.

In the embodiment shown, system 900 is connected to a network 935 (such as the Internet, a private network, a virtual private network, or other network), which may in turn be connected to various systems and computing machines (not shown), such as personal computers, laptop computers, servers, and/or smartphones of users, such as users 310, 1005, or 1905. In general, system 900 may input data from external machines and devices and output data to external machines and devices via network 935.

In the exemplary embodiment shown in FIG. 9, database 930 is a standalone database external to system 900. In other embodiments, database 930 may be hosted by system 900. In various embodiments, database 930 may manage and store data used to implement systems and methods consistent with the invention. For example, database 930 may manage and store data structures that contain data such as HC data 515, HCC flow data 565, data indicative of a health metric or a behavior affecting health, and/or cost information associated with health-related metrics, behaviors, and activities, etc.

Database 930 may comprise one or more databases that store information and are accessed and/or managed through system 900. By way of example, database 930 may be an Oracle™ database, a Sybase™ database, or other relational database. Systems and methods consistent with the invention, however, are not limited to separate data structures or databases, or even to the use of a database or data structure.

The preceding description of a computing system is exemplary and not meant to be limiting. In one or more exemplary implementations, the functions and processes described may be implemented in hardware, software, firmware, or any combination thereof. If implemented in software, the functions may be stored as instructions or code on a computer-readable medium. Computer-readable media includes both computer storage media and communication media including any medium that facilitates transfer of a computer program from one place to another. A storage media may be any available non-transitory media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to hold desired program code in the form of instructions or data structures and that can be accessed by a computer. Also, any remote device may be properly termed a computer-readable medium. Combinations of the elements described herein can also be included within the scope of computer-readable media.

Figure 10:
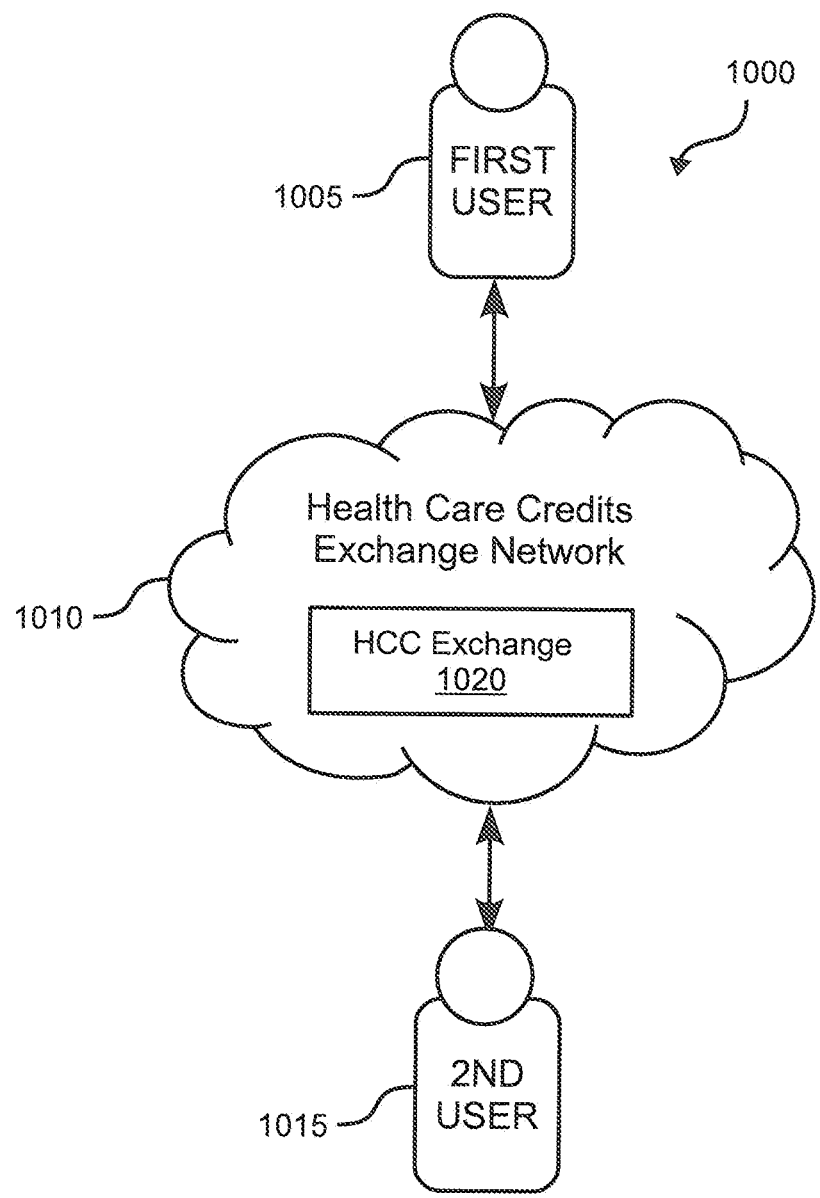
FIG. 10 is a block diagram of an exemplary health care credit and exchange system, consistent with the principles of the invention.

FIG. 10 is a block diagram of an exemplary health care credit and exchange system 1000, consistent with the principles of the invention. In various embodiments, for example as shown in FIG. 10, system 1000 enables earned incentives in one health plan to be conveyed or transferred to a person in another health plan and then used to pay for medical care and the like. System 1000 also allows use of HCCs, which represent a conveyable or transferable form of value, to pay for, or be exchanged for, health services (e.g., medical care and the like) independent of an individual's affiliation or non-affiliation with a particular health plan.

As shown in the example of FIG. 10, a first user 1005 may have an amount of points or credits or the like that were awarded to the first user 1005 by a health insurance plan, or the like, to which the first user 1005 belongs. In various embodiments, the HCCs may have been provided to the first user 1005 as an incentive or reward for performing health-benefiting behaviors. Using a health care credits exchange network 1010, the first user 1005 may transfer or convey all or a portion of their points or credits to a second user 1015, who may or may not belong to the same health insurance plan as the first user 1005.

As shown in this embodiment, the health care credits exchange network 1010 may include a health care credit exchange 1020, as described previously in this specification and the incorporated-by-reference applications, which acts as one example of a means to transfer HCCs from one party to another. In addition, various embodiments of the health care credits exchange network 1010 may include means for converting the points or credits issued by a health plan into HCCs, which may be implemented as transferable units of value, like a currency, and may be handled and processed by the HCC exchange 1020.

In various embodiments, the health care credits exchange network 1010 and/or the HCC exchange 1020 may be established by participating health plans (e.g., health insurance companies) and health-care related entities (e.g., health care providers, such as hospitals, labs, and physician groups). In general, health care credits exchange network 1010 may include processes and devices that enable creation and/or issuance of HCCs, monitoring, management, transferral, and conveyance of HCCs, creation, monitoring, and management of securities and/or derivatives that relate to HCCs, monitoring and management of the health-related behaviors and incentives underlying the HCCs, monitoring and management of the activities and data that underlie the incentives themselves, and the like, as described throughout this specification and the incorporated-by-reference applications.

As noted previously, the HCC exchange 1020 is not necessarily involved in all transfers of HCCs from the first user 1005 to the second user 1015, as the first user 1005 may transfer HCCs as a gift or as part of a barter or other transfer arrangement with the second user 1015. As described herein, the HCC Exchange 1020 may issue HCCs and transfer or convey HCCs, in some instances via associated brokers or third-party entities that trade for individuals or institutions for a commission. In some embodiments, the HCC Exchange 1020 may be responsible for setting trading rules, rules for brokerage commissions, reporting rules, self-reporting, and self-governance guidelines for its members. In some embodiments, the HCC Exchange 1020 may function in compatibility with mechanisms of the Chicago Commodities Exchange, NASDAQ stock exchange, or other similar entities.

Figure 11:
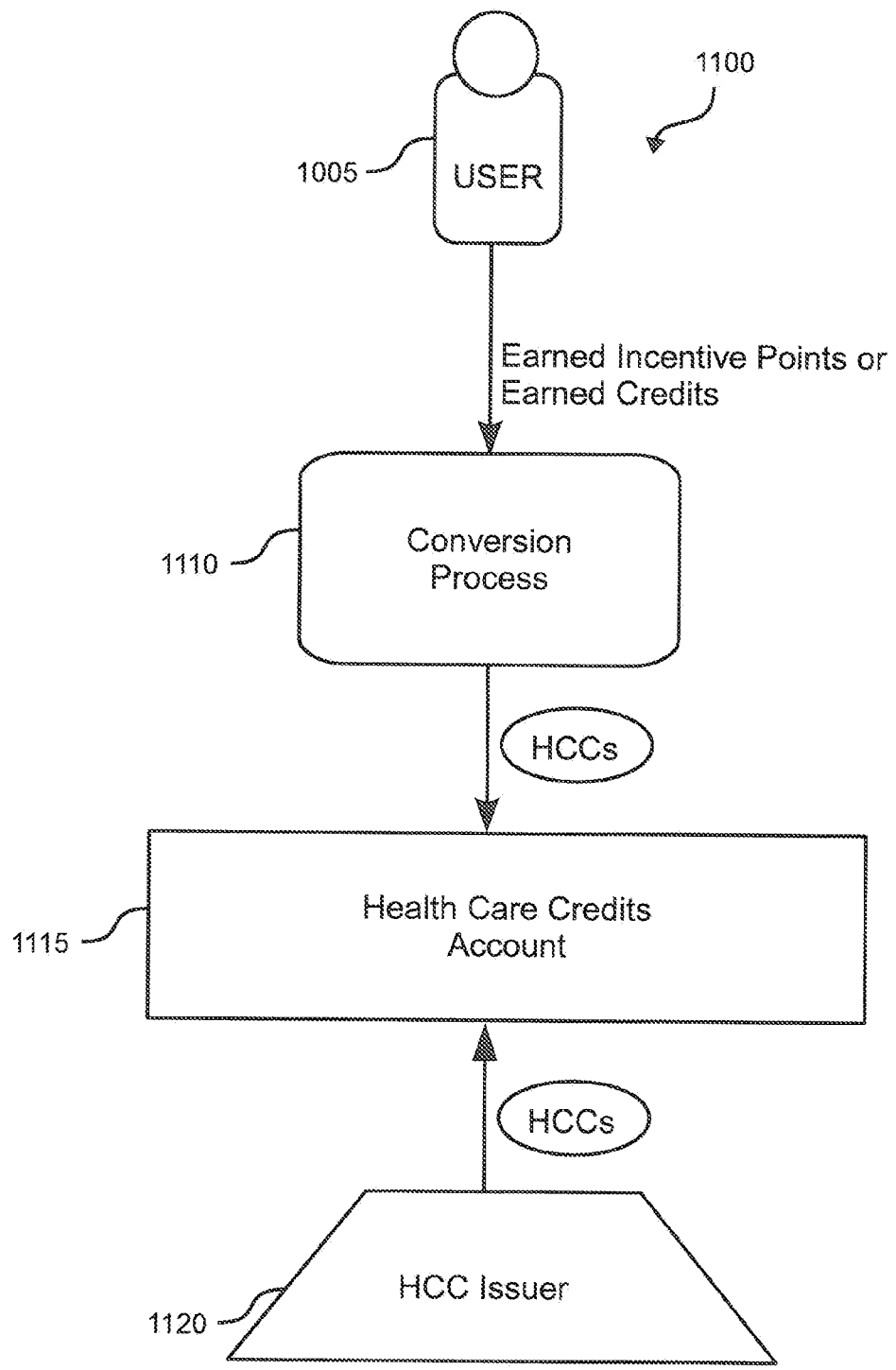
FIG. 11 is a block diagram of an exemplary subsystem of an exemplary health care credit and exchange system, consistent with the principles of the invention.

FIG. 11 is a block diagram of a subsystem 1100 of an exemplary health care credit and exchange system, such as system 1000, consistent with the principles of the invention. In the exemplary embodiment shown in FIG. 11, subsystem 1100 includes a conversion process 1110 that creates HCCs by converting incentive points belonging to the user 1005 (e.g., earned by the user 1005) into HCCs that may be initially stored and managed in a health care credits account 1115. From the health care credits account 1115, the HCCs may be sold, conveyed, exchanged, transferred, etc. to other parties as described throughout this specification and the incorporated-by-reference applications.

FIG. 11 also illustrates an HCC issuer 1120, such as a health insurance company, private philanthropic organization, or government entity, that may create, issue, or transfer HCCs, for example into health care credits account 1115, and back or support the initial value of the HCCs that it creates, so that the HCCs can be used like a form of currency for health care, or used for other purposes, or saved in an HCC account.

In some embodiments wherein HCCs do not originate via converting earned incentive points using conversion process 1110, but instead come into the health care credits account 1115 from the HCC issuer 1120, the HCCs may be purchased beforehand by the HCC issuer 1120, for example on an HCC Exchange 340 as explained with respect to FIG. 3. The value of purchased HCCs may be a market value set by the HCC Exchange 340 according to supply, demand, ask price, bid price, and other factors, as in stock and commodity exchanges. In various embodiments, HCCs may be thought of as a securitized or monetized form of incentive points, which originally have value but not liquidity. Converted into the form of HCCs, the health incentive points can become liquid, so they can be freely transferred, traded, speculated on, etc., unlike incentive points, and their market value can go up or down, depending on what a seller and buyer consider them to be worth, and on what they eventually agree on to be the price. In some embodiments, HCCs may have properties of securities, though they may not necessarily or technically be implemented in the form of an actual security.

As noted with respect to FIG. 10, in various embodiments, the HCCs may be a recognized and accepted sort of transferable or conveyable currency for health-related services and products, utilized by at least some of the participants or members of an HCC exchange network 1010. In some embodiments, a government, regulating body, or other entity may require that health care providers and health insurers participate in the HCC exchange network 1010, such that at least two different health insurance plans and their associated/participating health care providers (e.g., physicians) accept the HCCs as a form of currency or value for services and products, including health-related services and products.

Figure 12:
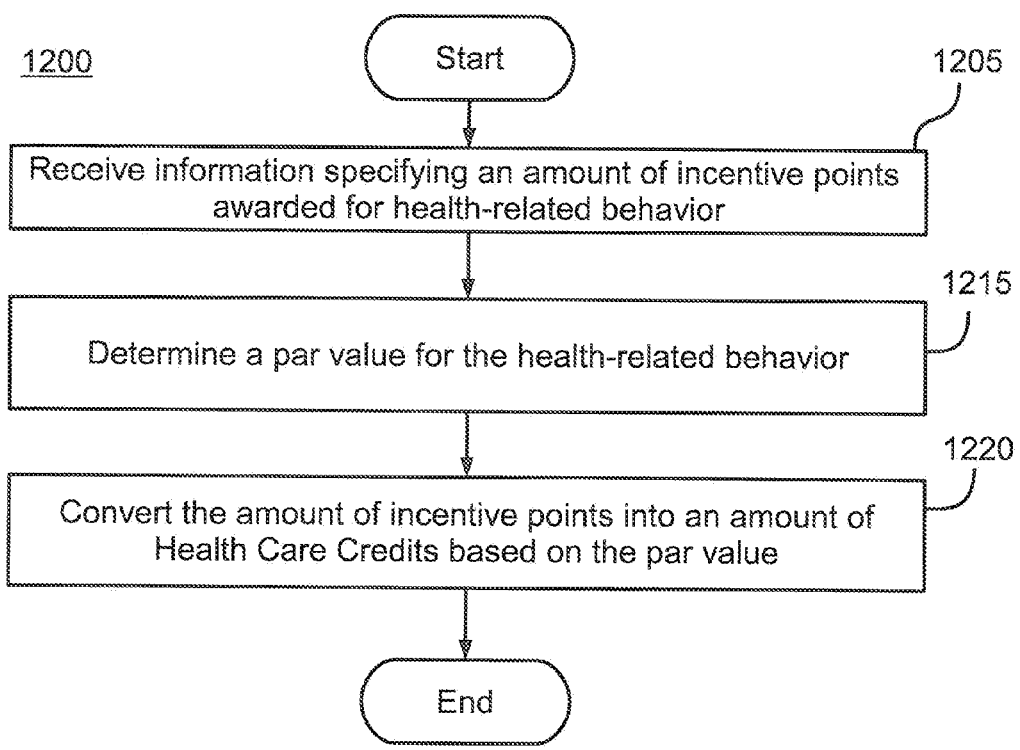
FIG. 12 is an exemplary process for converting non-transferable incentive points earned in a health care plan into freely transferable health care credits ("HCCs"), consistent with embodiments of the invention.

FIG. 12. is an exemplary process 1200 for converting non-transferable incentive points or credits earned in a health care plan into freely transferable HCCs, consistent with embodiments of the invention. In some embodiments, process 1200 may be used to implement conversion process 1110 of FIG.

11. In various embodiments, process 1200 may convert diversely valued, non-liquid incentive points or credits into more uniformly valued HCCs that can be freely conveyed, transferred, bought, sold, etc. In various embodiments, process 1200 may be implemented by a software program or application executed by a computing system, and the computing system may be part of a HCC brokerage, HCC exchange, etc.

In the embodiment shown, process 1200 begins with receiving information specifying an amount of incentive points awarded for health-related behavior. In various embodiments, an amount of earned incentive points associated with an individual in a particular health plan may be collected or managed in an electronic account for that individual that is provided by the plan. In some embodiments, the account may be attached to or associated with the individual's electronic health records or personal health record, while in other embodiments, the account may be an independent account. In various embodiments, the account may allow the account owner to indicate that he or she would like to convert those incentive points or credits into HCCs that can be conveyed or transferred outside of the plan. For example, the information received by stage 1205 may come from an individual, such as user 1005, who has 100 Kaiser Permanente™ incentive points that were earned or awarded for following a post-operative exercise and rehabilitation regimen, where within the Kaiser Permanente™ plan, the 100 incentive points may be worth $100.

At stage 1215, process 1200 determines a par value for the health-related behavior associated with the points. In various embodiments, the par value is created to represent an initial stated value of the incentive points, which may be a starting point for the market-determined value of the HCCs that result from conversion of the incentive points. The type and value of incentive points offered and earned in various insurance plans and/or offered by various employers may be broad and diverse, such that the incentive point values, and the corresponding dollar values, for the same health-related behavior will differ from plan to plan, from employer to employer, etc., and the par value is one means for normalizing or making more uniform these diverse values.

As noted previously, there may be many reasons for disparity between the type and value of incentive points awarded by various health care organizations, health insurance companies, and the like, in relation to the same activities and behaviors. In some instances, a company may award more incentive points than another company for a given activity because it has data or statistics indicating value associated with that activity, which, e.g., translates into avoidance of cost to the company, where the other company does not have, or has not recognized, the data or value. In such instances, the health care organization or company may market their plans and services to particular groups of individuals who are most likely to perform the given behavior, procedure, activity or regimen, using the incentive disparity as a marketing tool. For example, insurance company A may use a marketing tagline such as "Company A gives 50% more incentive points for activity Y that Company B, so sign up with us today for your health care insurance coverage," or the like.

In various embodiments, stage 1215 may be implemented by an electronic computing system that calculates the par value based on a previously established value(s) of the underlying health-related behavior or actions which led to the incentive points. In some embodiments, stage 1215 may determine a par value based on the value of the health-related behavior in at least one, and in various embodiments two or more, other sources of health care cost data, such as health plans. For instance, continuing the example of 100 Kaiser Permanente™ incentive points that were earned or awarded for following a post-operative exercise and rehabilitation regimen, the value of that regimen may be compared with the value of that regimen as determined by at least two other recognized sources. In some embodiments, the sources may be other health plans, etc. (including government-sponsored health plans) that are participants in the health care credits exchange network 1010. Thus, the value of the regimen as determined by ConnectiCare™ and Humana™ may be used to determine a par value for the Kaiser Permanente™ point—e.g., if the value of the regimen in ConnectiCare™ is $90, and the value in Humana™ is $110, then an average calculation (($90+$110)/2) may be used to determine the par value of the Kaiser Permanente™ points at $100. In other embodiments, a different calculation, such as a median calculation, a weighted average, or the like, may be used to calculate a par value. In various embodiments, information regarding the values of various health care behaviors, regimens, procedures, etc. may be stored in an electronic database maintained by the health care credits exchange network 1010.

In other embodiments of stage 1215, par value may be determined using the value of the health-related behavior set by a source that is considered a standard, such as a government-sponsored health plan, or set by some other recognized standard source. For example Medicare may be used as a standard source for a par value calculation, as Medicare has assigned a monetary value to a wide range of health-related behaviors, including procedures, treatments, activities, etc. such as exercise regimens, dietary choices, self-testing, therapeutic treatments, device treatments, and the like.

In some embodiments, the standard source values (e.g., Medicare values) may be used to assign a standardized par value for the incentive points or credits belonging to individuals enrolled in a broad range of health plans based on the health-related behavior that generated the incentive points or credits. For instance, continuing the example of 100 Kaiser Permanente™ incentive points that were earned or awarded for following a post-operative exercise and rehabilitation regimen, if the Medicare value of the regimen is $80, then process 1200 may assign a par value of $80 to the regimen and to the 100 Kaiser Permanente™ incentive points, regardless of Kaiser Permanente's in-plan value of $100 for the regimen and the 100 Kaiser Permanente™ incentive points. In other embodiments, the par value may be set by a purpose-designed incentive evaluation program or function.

In some embodiments the standard source values (e.g., Medicare values) may be used to indirectly derive a standardized par value for a health-related behavior not covered by the standard source (and for the associated incentive points or credits) based on the value of other health-related behaviors in relation to the standard source values. This is explained in greater detail below with respect to FIG. 13.

At stage 1220, process 1200 converts the incentive points into HCCs based on the par value determined in stage 1215. In the embodiment shown in FIG. 12, the HCCs differ from the incentive points or credits at least because the HCCs are freely transferable and conveyable between the owner and another party regardless of health plan membership, unlike incentive points, and because the monetary value of the HCCs outside of the originating plan, (as reflected in the par value) may differ from the monetary value of the incentive points inside the plan as described above with respect to stage 1215. In various embodiments, a computing system associated with a broker or other participant in health care credits exchange network 1010 may manage an HCC account that holds the HCCs created in stage 1220. The HCCs may be sold, transferred, etc., from the HCC account, as described previously in this specification with respect to FIGS. 1-4 and 7, and in the incorporated-by-reference applications. In various embodiments, the open market value of the HCCs may be determined via a negotiation between the transferor (e.g. seller) and the transferee (e.g., buyer), based on an ask and a bid, and the final agreed market price may be set at par, at a premium above par, or at a discount to par.

FIG. 13 illustrates an example of deriving a par value for a health-related behavior based on the value of other health-related behaviors in relation to a standard reference, such as Medicare values, consistent with embodiments of the invention. In some embodiments, a calculation as described with respect to FIG. 13 may be performed by process 1200. As shown in FIG. 13, table 1300 includes a Behavior column 1305, each row of which specifies a health-related behavior or activity, such as undergoing procedure X (column 1305, row 1330), engaging in behavior Y (column 1305, row 1335), performing activity Z (column 1305, row 1340), performing regimen A (column 1305, row 1345), and undergoing procedure B (column 1305, row 1350).

Table 1300 also includes a Standard Reference column 1310 that indicates a standard cost or value associated with the health-related behavior in each row. In some embodiments, the standard values for each health-related behavior in column 1305 may be a value set by Medicare as the standard reference source, whereas Medicare has already established reimbursement costs for many health-related products, services, and behaviors. As shown in the cells at the intersection of column 1310 and rows 1345 and 1350, some behaviors do not have a standard cost or value provided by the Standard Reference source, which is indicated by "NA."

Table 1300 also includes Company A column 1315 that indicates an amount of incentive points or credits awarded by company A for the health-related behavior in each row; Company B column 1320 that indicates an amount of incentive points or credits awarded by company B for the health-related behavior in each row; and Company C column 1325 that indicates an amount of incentive points or credits awarded by company C for the health-related behavior in each row. In some embodiments, companies A, B, and C may be health insurance companies or organizations. In various embodiments, the information in table 1300 may be stored in a data structure accessible by a program or application that computes a par value for a health-related behavior, such as a program or application implementing process 1200.

A process, such as process 1200, may use the information in table 1300 to determine a par value for a health-related behavior that does not have a standard reference value ("NA" in column 1310), such as Regimen A in row 1345 and Procedure B in row 1350, by calculating the value of a company's point for other standard-reference health behavior(s), and then multiplying that value by the number of points awarded by the company for the health-related behavior that does not have a standard reference value. In various embodiments, the value of a company's point may be calculated using an average calculation, a weighted average calculation, a median calculation, or some other calculation.

For example, using an average calculation, the average standard value per point for Company A may be calculated by adding the standard reference costs (column 1310) of health-related behaviors (column 1305) for which table 1300 contains incentive point entries for company A (rows 1330 and 1335 of column 1315) and dividing the result by the sum of the incentive points for company A (the cells of table 1300 at the intersection of row 1330 and column 1315 and at row 1335 of column 1315). Thus, for company A, this calculation is:

Average Standard Reference $ per Co. A point =

($100 + $200)/(50 pts.+100 pts) =

$300/150 pts = $2/point for Company A.

Similarly for company B, the calculation is:

Average Standard Reference $ per Co. B point =

($100 + $200 + $300)/(200 pts.+380 pts + 550 pts) =

$600/1130 pts = $0.53/point for Company B.

A similar calculation for Company C results in an average value of $0.97 per point for Company C.

To determine a par value for regimen A (row 1345), which does not have a standard reference value (NA at intersection of column 1310 and row 1345), the number of incentive points awarded by Company A for regimen A (150 incentive points, at intersection of column 1315 and row 1345) may be multiplied by the average standard value per point for Company A ($2 per point, calculated above) to yield $300. Similarly, to derive a par value for procedure B (row 1350), which does not have a standard reference value (NA at intersection of column 1310 and row 1350), the number of incentive points awarded by Company B for regimen A (700 incentive points, at intersection of column 1320 and row 1350) may be multiplied by the average standard value per point for Company B ($0.53 per point, calculated above) to yield $371.

As noted above with respect to FIG. 12, these par values may be used to convert incentive points into a number of HCCs that is equal to the par value, based, for example, on the current market price of an HCC. For example, if the current market value of an HCC is $1, then the 700 Company B incentive points awarded for procedure B (intersection of column 1320 and row 1350) may be converted into a lot of 371 HCCs, and the 150 Company A incentive points awarded for regimen A (intersection of column 1315 and row 1345) may be converted into 300 HCCs.

In addition to par value calculators, other computer programs, such as apps for smart phones, etc. may use the information in table 1300. For example, programs or apps that allow individuals with HCC accounts to calculate the number of credits they need for a given health-care procedure, to calculate how much their HCCs are worth if they trade them, to perform the actual trades or exchanges of HCCs, etc. may access data such as is shown in table 1300 to perform their functions. In other areas, social media services, such as Facebook™, Twitter™, etc., may provide programs that access data such as is shown in table 1300 and provide functionality for users to "advertise" their available credits.

Figure 14:
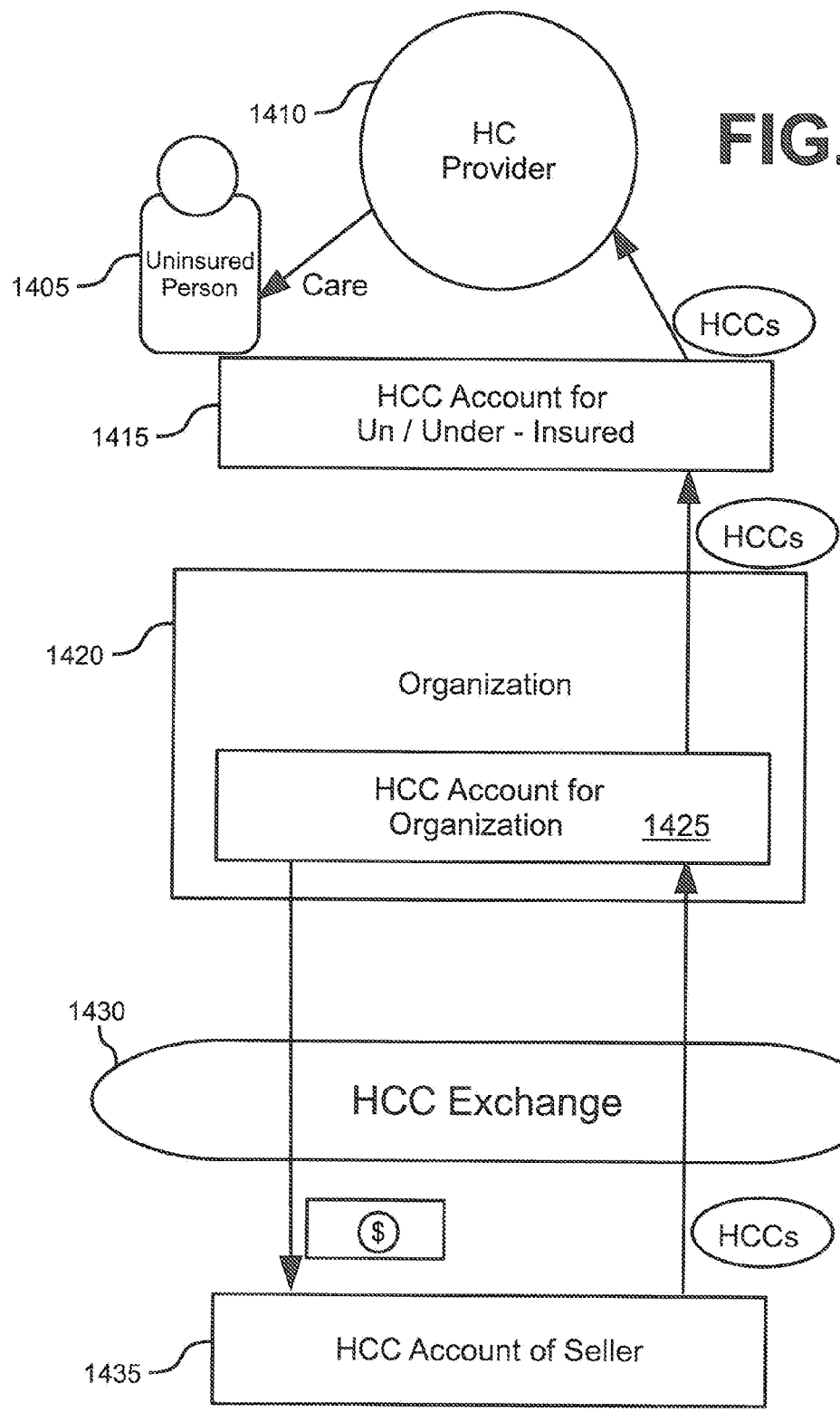
FIG. 14 is a block diagram of an exemplary system for transferring HCCs to an individual(s) that is unable to pay for health care products and services, consistent with embodiments of the invention.

FIG. 14 is a block diagram of an exemplary system for transferring HCCs to an individual(s) that is unable to pay for health care products and services, consistent with embodiments of the invention. In the exemplary embodiment shown in FIG. 14, an under-insured or uninsured person 1405 may use HCCs placed into a HCC account 1415 by an organization 1420 to pay for health care products and services provided by a health care provider 1410.

The health care provider 1410 may be any type of professional or vendor of health-related goods or services, as described throughout this specification and the incorporated-by-reference applications, and uninsured person 1405 may convey or transfer HCCs to health care provider 1410 in exchange for health-related goods or services and in lieu of a cash payment or insurance arrangement. In various embodiments, the transfer of HCCs to health care provider 1410 from HCC account 1415 may be implemented electronically over a computer network or phone line, such that the HCCs are credited to an account (not shown) of health care provider 1410. In such embodiments, health care provider 1410 may be a physician or other health care provider that accepts HCCs as a form of payment for medical care in lieu of cash or insurance. In some such embodiments, the physician may register with an HCC exchange network and agree to accept HCCs as a form of payment, either alone or together with cash and/or a partial payment from an insurance plan. In some cases, a patient may use HCCs to make up the difference between what is owed by the patient for health care services and what is paid for by insurance. As explained in more detail in the co-pending applications that have been incorporated by reference, a health insurance plan may receive a bill from a participating physician, and after any co-payment and co-insurance are applied to the balance, may receive HCCs that are withdrawn from the patient's HCC account to pay for the remainder of the bill, either in total or together with cash. In some scenarios, the patient may receive a bill directly from the participating physician, and the patient may determine how many HCCs he or she wishes to use for payment and initiate transfer of the HCCs to the physician.

The HCC account 1415 may be an electronic account for managing health care credits, as described throughout this specification and the incorporated-by-reference applications, and may be established by or for, and/or under the control of, the uninsured person 1405. In some embodiments, the HCC account 1415 for the uninsured person 1405 may be established by the uninsured person 1405. In other embodiments, the HCC account 1415 for the uninsured person 1405 may be established by an organization, such as organization 1420, which may establish HCC accounts for individuals or groups who do not have health insurance or who do not have the financial means to pay for adequate medical care, either for themselves or for their families. Accounts such as account 1415 do not have to be affiliated with a specific insurance plan or an employer. They may be independent HCC accounts, similar to bank accounts or securities accounts.

In various embodiments, the organization 1420 may be a party unrelated to the uninsured person 1405, such as a charitable foundation or organization, a public or private welfare organization, or a philanthropic individual. As shown in this example, the organization 1420 may have an HCC account 1425 associated with it. In some embodiments, organization 1420 may be a state or federal government, or a government-affiliated organization that is tasked with incentivizing greater wellness among citizens. In such embodiments, the government organization 1420 may use a computerized system to identify or select citizens or individuals within a certain income level (e.g., below the poverty income level) and designate those citizens (e.g., uninsured person 1405) as eligible recipients of HCCs from the government. The government organization 1420 may supply the eligible recipients with HCCs, which must be used for health care and health-related products and services.

The government organization 1420 may require the eligible recipients to open an HCC account, such as HCC account 1415, with an account provider, or may open an HCC account 1415 on behalf of each eligible recipient. The government organization 1420 may deposit HCCs into these accounts, and the eligible recipient owners of the accounts could then use the deposited HCCs to pay for health-related expenses, such as visits to a physician or health care provider 1410. The government organization 1420 may use the awarding of HCCs as an incentive for the eligible recipients to engage in health-benefiting behaviors and actions that are advantageous to the individuals' health.

In the embodiment shown in FIG. 14, the organization 1420 may transmit an electronic communication to an HCC Exchange 1430, via, for example, a digital communications network or a phone line, that includes a bid or a request to purchase one or more HCCs. Upon receipt, HCC Exchange 1430 may log the bid in a computerized trading system and match the bid with at least one "ask" offer to sell one or more HCCs, which was transmitted to HCC Exchange 1430 by a seller associated with HCC seller account 1435. If a bid-ask match is made, an amount of money equal to the bid price is electronically transferred from the account 1425 of organization 1420 to the account 1435 of the seller, and the purchased amount of HCCs are electronically transferred from the account 1435 of the seller to the account 1425 of organization 1420. The details of the operation of HCC exchange 1430 are explained throughout this specification, including with respect to FIGS. 3 and 4, and the incorporated-by-reference applications. Similarly, HCC exchange 1430 may match bids and asks and complete trades, as performed in the stock and commodity exchange arts.

As noted above, once the purchased HCCs are in the HCC account 1425 of organization 1420, the organization 1420 may then convey or transfer the HCCs to an individual(s), such as uninsured person 1405, who may then use the HCCs to receive health care services and products that would not otherwise be available to them.

Figure 15:
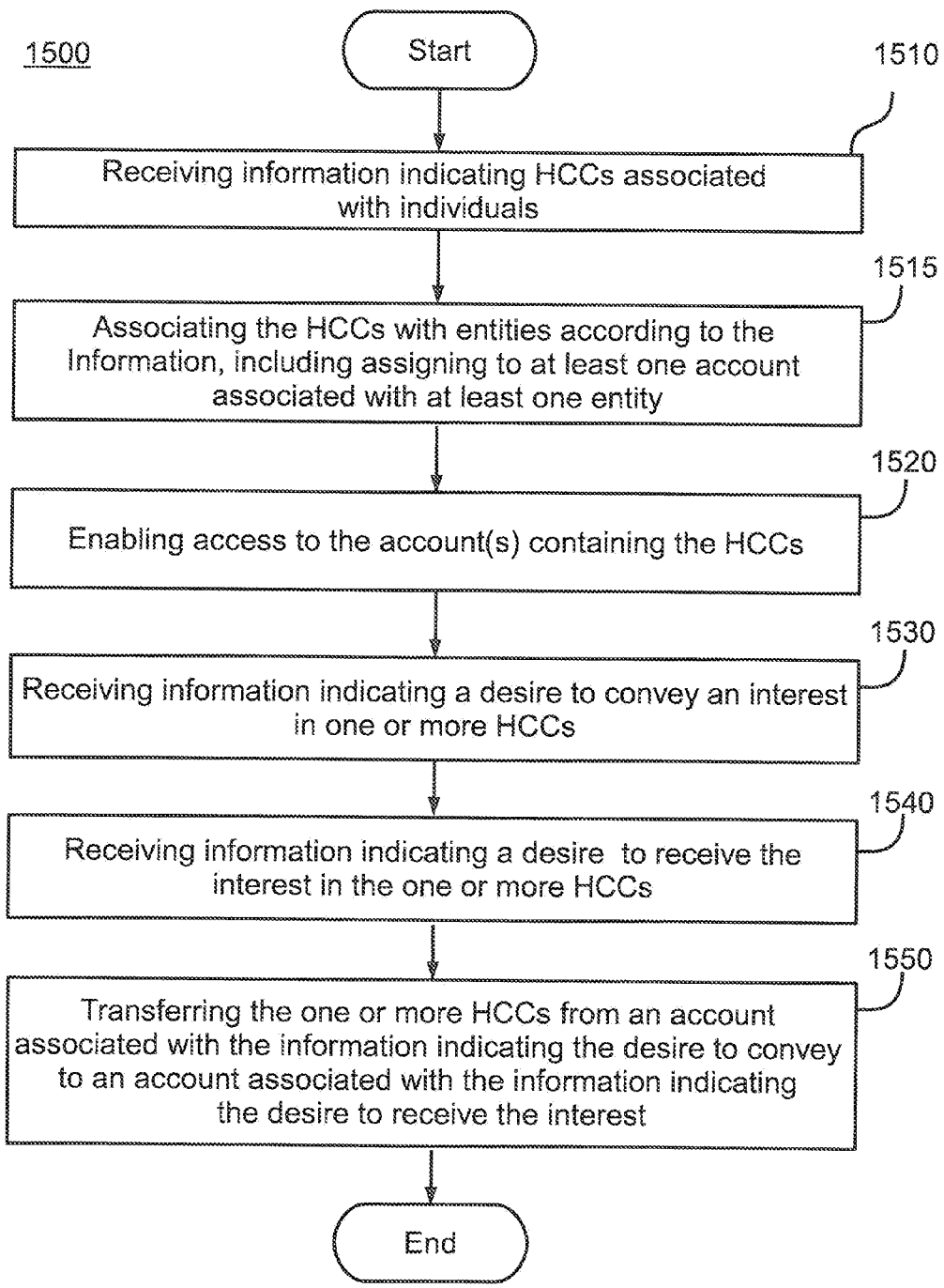
FIG. 15 is a flowchart of an exemplary process for facilitating health care credit transactions, consistent with embodiments of the invention.

FIG. 15 is a flowchart of an exemplary process 1500 for facilitating health care credit transactions, consistent with embodiments of the invention. In some embodiments, process 1500 may be implemented by a computing system included in a HCC exchange, such as HCC exchange 340 of FIG. 3 or HCC exchange 1430 of FIG. 14.

As shown, process 1500 begins with receiving information describing, specifying, or indicating HCCs associated with individuals (stage 1510). In various embodiments, the HCCs may have been previously calculated and awarded to a variety of individuals based on data indicative of the individuals' health and/or data indicative of behaviors affecting the individuals' health. In some embodiments, the amount of health care credits may have been previously calculated and awarded to individuals based on a cost reduction in health care associated with the metrics or the behaviors.

In some embodiments, the received information may be digital information received over a digital communication network by a computing system or server system that operates as part of an HCC exchange, as part of an HCC brokerage firm, or as part of some other organization that maintains accounts that hold and manage HCCs for individuals and other entities. In some embodiments, the received information may be transmitted by a health care provider, a health insurer, or an individual, among other sources.

At stage 1515, process 1500 associates the HCCs with entities according to the received information. For example, each lot of HCCs may be associated with the individuals that earned, or otherwise own, the HCCs. In various embodiments, a server or other computing system implementing process 1500 may associate the HCCs by updating a database containing a profile or data file for each entity among the entities.

In the embodiment shown, stage 1515 may also assign the HCCs to one (or more) account associated with each entity according to the information received in the previous stage, such as HCC account, as described throughout this specification and the incorporated-by-reference applications. In some embodiments, the data files or profiles may be part of, or linked to, an HCC account.

At stage 1520, process 1500 enables access to the account(s) containing the HCCs. In various embodiments, access may be enabled over a network, such as digital communications network. For example, an entity, such as an individual that was awarded HCCs, may be able to log into a server-run web site over the internet using a desktop or laptop computer, and control an HCC account using the web site interfaces, similar to the way online banking accounts, online stock accounts, online commodity accounts, etc. are accessed and controlled. In various embodiments, access to the account may include the ability to perform operations for initiating a sale or trade of health care credits in exchange for currency, reward program points, credits for other goods or services, etc. In some embodiments, process 1500 may display to an individual who has access to an account a number of credits earned by and associated with the individual, enable the individual to manipulate a user interface element to select up to all of the number of credits earned by and/or associated with the individual, and enable the individual to manipulate a user interface element to transmit a desire to transfer the selected number of health care credits.

At stage 1530, process 1500 receives information indicating a desire or permission to convey or transfer an interest in one or more HCCs. For example, a server or other computing system at a brokerage or HCC exchange may receive sell order information from the owner/user of an HCC account indicating that the owner wishes to sell a specified number of HCCs from the account on an HCC exchange. For another example, a server at an HCC account provider, such as a bank or insurance company, may receive transfer order information from the owner of an HCC account indicating that the owner wishes to transfer a specified number of HCCs from their account to another HCC account, such as the account of a family member or a health care provider.

At stage 1540, process 1500 receives information indicating a desire to receive the interest in one or more HCCs. For example, a server or other computing system at a brokerage or HCC exchange may receive buy order information from the owner/user of an HCC account, indicating that the owner wishes to purchase a specified number of HCCs on an HCC exchange. For another example, a server at an HCC account provider, such as a bank or insurance company, may receive transfer order information from the owner of an HCC account, indicating that the owner wishes to transfer a specified number of HCCs from their account and including information indicating the transferee that desires to receive the HCCs, such as information specifying the HCC account of the transferee that is receiving HCCs as a gift.

After receiving the information indicating the desire to convey HCCs and to receive HCCs, process 1500 finishes at stage 1550 by executing a transaction to transfer HCCS from the account associated with the information indicating the desire to convey or transfer (e.g., the account of the seller or transferor) to the account associated with the information indicating the desire to receive (e.g., the account of the buyer or transferee).

One of ordinary skill in the art will recognize that process 1500 depicted in FIG. 15 is an exemplary, generalized illustration and that stages and features may be added to, removed from, or modified within process 1500 without departing from the principles of the invention. For example, a stage may be added to receive an electronic payment from, or message indicating payment by, a buyer associated with the second indication and stage 1550 may be modified to execute the transfer only upon receiving the payment. For another example, stages may be added for receiving a registration for one or more entities, by an operator or administrator of the server system, and for creating a profile or data file associated with one or more of the entities based on information in the registration. For yet another example, stages following the execution of the transaction may be added for sending to an individual associated with the first indication a message confirming that the transaction has completed, and for updating that individual with a display of the individual's remaining number of health care credits. For yet another example, stages may be added for requiring submitters of second indications, such as prospective health care credit buyers, to register with an operator or administrator of the server system, and to submit payment information. For still another example, stages may be added for adjusting a price that an entity submitting a second indication must pay for a health care credit based on a comparison between a calculated demand for health care credits and a number of available health care credits.

Figure 16:
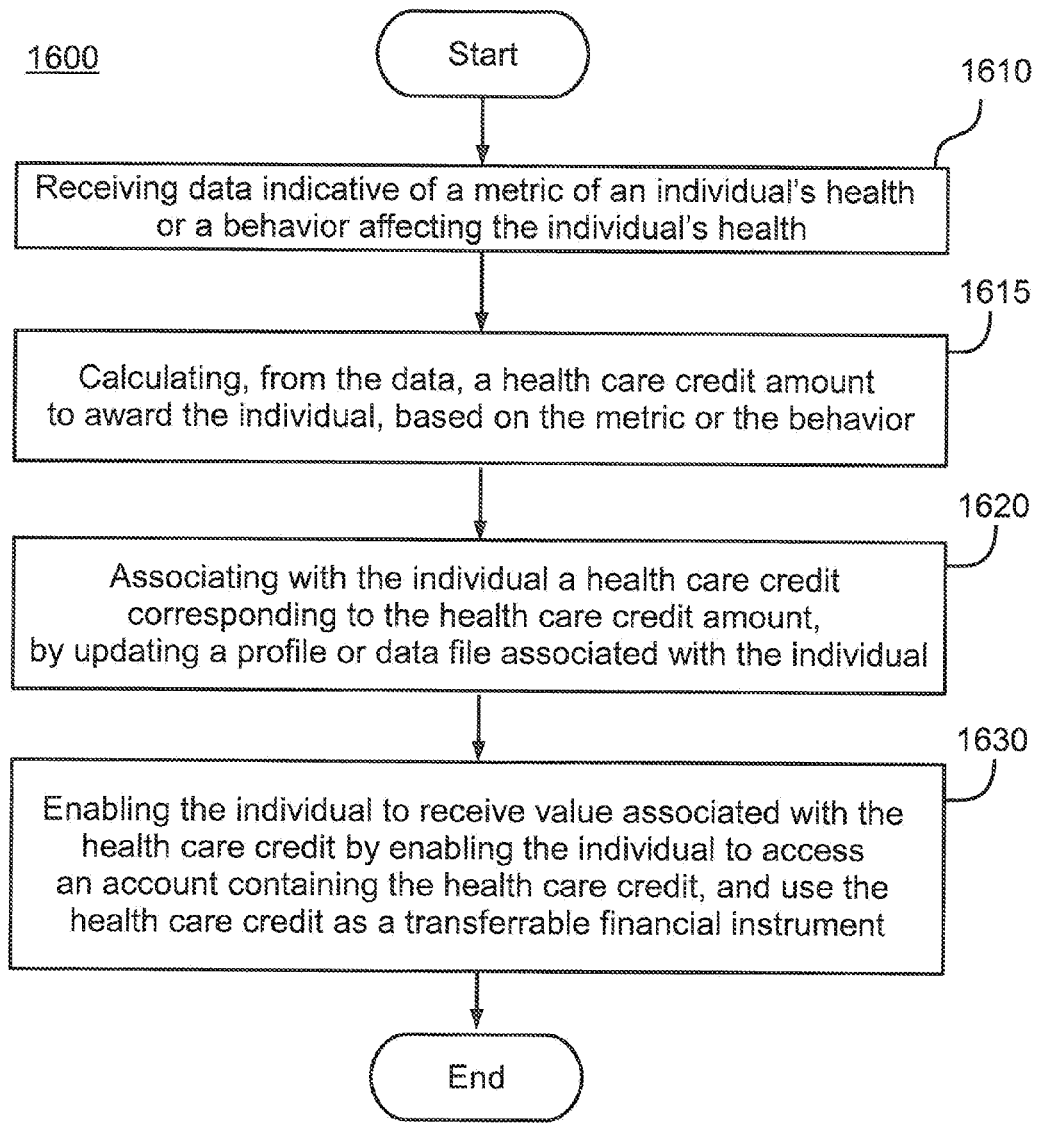
FIG. 16 is a flowchart of an exemplary process associated with a health care credit program, consistent with embodiments of the invention.

FIG. 16 is a flowchart of an exemplary process 1600 associated with a health care credit program, consistent with embodiments of the invention. In some embodiments, process 1600 may be implemented by a computing system, for example, by a computing system provided by an insurance provider, an account provider, an account servicer, or the like, as described in this specification and the incorporated-by-reference applications.

As shown, process 1600 begins with receiving data indicative of a metric of an individual's health or a behavior affecting the individual's health (stage 1610). In various embodiments, the data indicative of a metric of an individual's health may be data gathered or generated as part of a health assessment, for example, as described with respect to FIGS. 4 and 5 of incorporated-by-reference application Ser. No. 13/273,430 and Ser. No. 13/273,366. In various embodiments, the data may be received over a network, such as the Internet. Examples of metrics of an individual's health include the individual's weight, body mass index, blood pressure, cholesterol levels, current illnesses or diseases, and the like. Another example is a baseline health level of the individual. Similarly, in various embodiments, the data indicative of a behavior affecting the individual's health may be data gathered or generated as part of a health assessment, for example, as described with respect to FIGS. 4 and 5 of incorporated by reference application Ser. No. 13/273,430 and Ser. No. 13/273,366. Examples of behaviors affecting the individual's health include exercising, taking of medication, submitting to medical examination, eating healthy foods, reducing calorie intake, reducing body weight, reducing body mass index, having a diagnostic exam, receiving a medical treatment, using a medical device, and ceasing smoking, and the like.

At stage 1615, process 1600 calculates, using the data received in the previous stage, an amount of health care credits to award to the individual, according to the metric or behavior. In various embodiments, stage 1615 may calculate the amount by determining a predicted, estimated, or actual health-care cost savings or reduction associated with the metric or behavior (e.g., a dollar amount of savings) and converting the predicted or actual health-care cost savings into an amount of HCCs or, in some embodiments, incentive points. For example, if an individual reduces their body mass index to within preferred medical guideline limits, then there may be, for example, a predicted, estimated, or historical health-care cost savings of $300 per year associated with this metric, and according to the individual's health insurance plan, $300 may be considered to be worth 300 incentive points or an amount of 300 HCCs. For another example, if an individual follows a cholesterol care regimen, including taking statin medication daily, then there may be a predicted health-care cost savings of $100 per year associated with this behavior, and the individual's health insurance plan may set the conversion rate of dollars to incentive points or HCCs at 2 to 1, such that the $100 may be converted to 50 incentive points or an amount of 50 HCCs.

In some embodiments, the predicted or actual health-care cost savings or reduction associated with the metric or behavior may be retrieved from a database or data store indexed and searchable by metric or behavior, where the dollar amounts are derived from clinical trials, medical studies, empirical statistical evidence gathered by insurance companies reflecting the histories of insureds, or other similar sources. In some embodiments, stage 1615 may calculate the HCC amount after adjusting a baseline health-care cost savings (for example, as retrieved from a database) to reflect the individual's personal characteristics, such as race, age, height, weight, family history, previous treatments, etc.

In some embodiments, the received data may be a metric that indicates an initial or current health level of the individual, and a predicted or estimated health-care cost savings or reduction associated with the metric may be calculated by comparing the initial health level to a baseline health level for a population having characteristics similar to characteristics of the individual and estimating or assigning an amount to the cost reduction based on a difference between the initial health level and the baseline health level.

In some embodiments, the received data may include a metric reflecting a measurement of an initial health level for the individual, and a metric reflecting a measurement of a subsequent health level for the individual, and calculating the health care credit amount may include estimating or assigning a value to the health care credit amount based on a difference between the initial health level and the subsequent health level.

In some embodiments, stage 1615 may determine medical care that will be, or is predicted to be, avoided by the individual because the individual performs the behavior affecting the individual's health as indicated in the received data, and may estimate or assign a value for the health care credit amount based on a cost of the avoided medical care. In various embodiments, all or a portion or a fraction of the cost of the avoided medical care may be used to calculate the amount of HCCs to award. Examples of avoided medical care include a health care protocol, a health care regimen, a diagnostic test, a health care procedure, and a health care treatment, among others.

At stage 1620, process 1600 associates one or more health care credits with the individual, where the one or more HCCs correspond to the amount of HCCs or incentive points calculated in the previous stage. In the embodiment shown, the HCCs are associated with the individual by updating a profile or data file associated with the individual. In various embodiments, the profile or data file may correspond to, be associated with, or be part of an HCC account, such as HCC account 136, 143, 146, 310-325, or 360-375, or the like.

At stage 1630, process 1600 enables the individual to receive value associated with the one or more health care credits by enabling the individual to access an account containing the one or more health care credits. As just noted, in various embodiments, the account may be an HCC account, such as HCC account 136, 143, 146, 310-325, or 360-375, as described throughout this specification and the incorporated-by-reference applications.

In various embodiments, the individual may access the account to perform actions transferring the HCCs contained in the account like a form of currency, either in exchange for something of value (e.g., cash, products, insurance, or services) or as a gift, as described, for example, with respect to FIGS. 2, 3, 4, and 7. In the embodiment shown, HCCs contained in HCC accounts may act like, and/or may be considered transferable financial instruments, similar to cash, bearer bonds, etc.

One of ordinary skill in the art will recognize that process 1600 depicted in FIG. 16 is an exemplary, generalized illustration, and that stages and features may be added to, removed from, or modified within process 1600 without departing from the principles of the invention. For example, stages may be added to embody the one or more HCCs in a physical financial instrument, and to transfer or deliver the physical financial instrument to the individual. For another example, a stage may be added to enable the transfer of the one or more health care credits to a health care provider, either in electronic form (e.g., from HCC account to HCC account) or in physical form (e.g., in implementations where the HCC is embodied as a physical financial instrument). In some such embodiments, the HCC may be transferred to the health care provider as a reward or compensation for providing health care services or products to the individual, including providing information or direction to the individual regarding the individual's health or the behavior affecting the individual's health.

Figure 17:
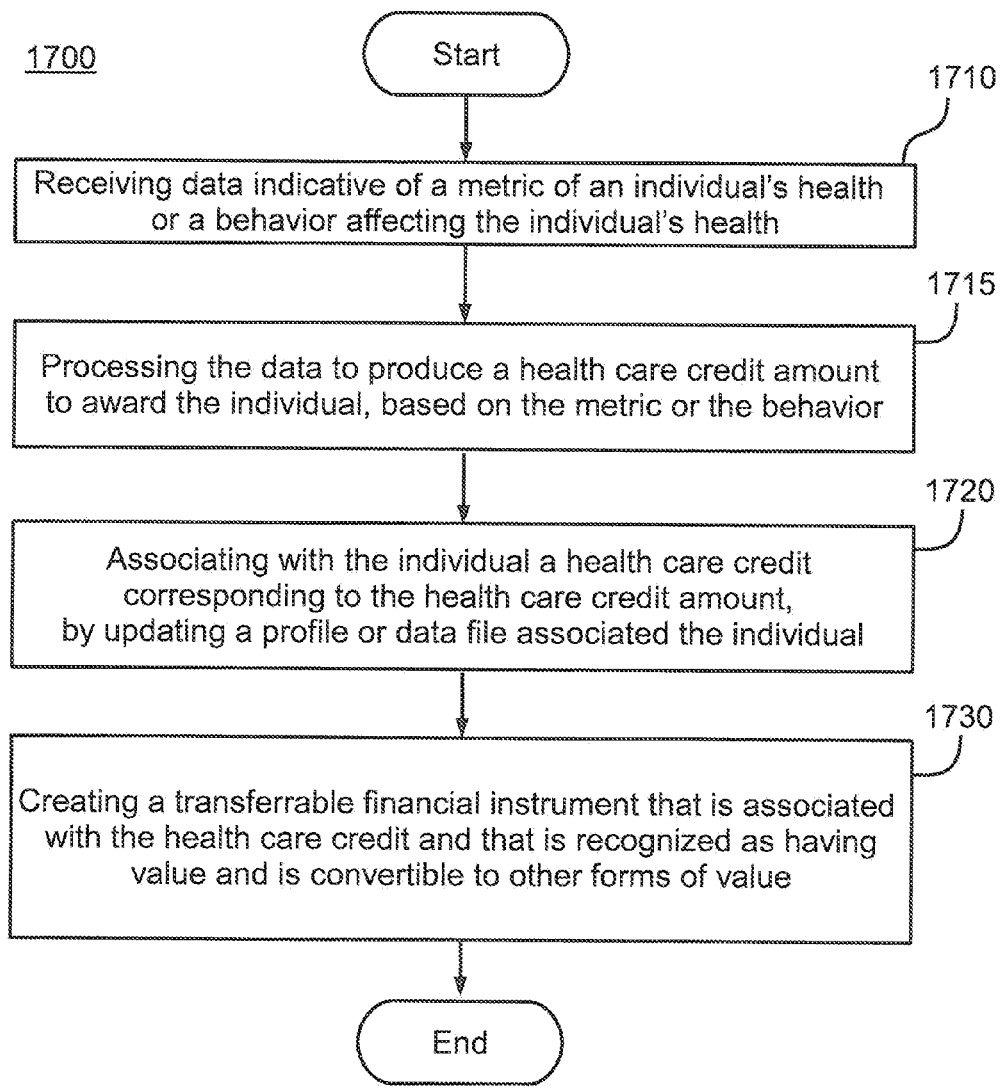
FIG. 17 is a flowchart of an exemplary process associated with a health care credit program, consistent with embodiments of the invention.

FIG. 17 is a flowchart of an exemplary process 1700 associated with a health care credit program, consistent with embodiments of the invention. In some embodiments, process 1700 may be implemented by a computing system, for example, by a computing system provided by an insurance provider, an account provider, an account servicer, or the like, as described in this specification and the incorporated-by-reference applications.

As shown, process 1700 begins with receiving data indicative of a metric of an individual's health or a behavior affecting the individual's health (stage 1710). In various embodiments, the data indicative of a metric of an individual's health may be data gathered or generated as part of a health assessment, for example, as described with respect to FIGS. 4 and 5 of incorporated by reference application Ser. No. 13/273,430 and Ser. No. 13/273,366. The data may be received over a digital communications network in various embodiments. Examples of metrics of an individual's health include the individual's weight, body mass index, blood pressure, cholesterol levels, current illnesses or diseases, and the like. Another example is a baseline health level. Similarly, in various embodiments, the data indicative of a behavior affecting the individual's health may be data gathered or generated as part of a health assessment, for example, as described with respect to FIGS. 4 and 5 of incorporated by reference application Ser. No. 13/273,430 and Ser. No. 13/273,366. Examples of behaviors affecting the individual's health include exercising, taking of medication, submitting to medical examination, eating healthy foods, reducing calorie intake, reducing body weight, reducing body mass index, having a diagnostic exam, receiving a medical treatment, using a medical device, ceasing smoking, and the like.

At stage 1715, process 1700 processes the data received in the previous stage to calculate an amount of health care credits to award to the individual, based on the metric or behavior. In various embodiments, stage 1715 may be implemented in a manner similar to the embodiments described above with respect to stage 1615 of FIG. 16. For example, in various embodiments, stage 1715 may account for a cost or cost reduction in health care associated with the metric or the behavior as part of calculating an amount of health care credits to award to the individual based on the metric or behavior.

At stage 1720, process 1700 associates one or more health care credits with the individual, where the one or more HCCs correspond to the amount of HCCs or incentive points calculated in the previous stage. In the embodiment shown, the HCCs are associated with the individual by updating a profile or data file associated with the individual. In various embodiments, the profile or data file may correspond to, be associated with, or be part of, an HCC account, such as HCC account 136, 143, 146, 310-325, or 360-375. In various embodiments, stage 1720 may be implemented in manners similar to the embodiments described above with respect to stage 1620 of FIG. 16.

At stage 1730, process 1700 creates a transferable financial instrument associated with the health care credit, where the instrument is recognized as having value and is convertible to other forms of value. In various embodiments, the transferable financial instrument may be in electronic form or in physical form. In various embodiments, the transferable financial instrument may be a contractual right for the owner of the instrument to receive cash and/or health-care related goods or services. In some embodiments, a party, who may be the issuer of the financial instrument (e.g., a health care insurer, health care provider, or other issuer of the financial instrument) may be obligated (for example, legally obligated under the contract terms of the financial instrument) to redeem the transferable financial instrument for cash in an amount, and under terms, specified by the instrument.

In some embodiments, stage 1730 may include obligating payment of an amount of cash derived from a health cost reduction associated with the individual to an owner or holder of the transferable financial instrument by a party benefitted by the health cost reduction, such as, for example, a private entity that provides or sponsors health insurance (such as a health insurance company) or a public entity that provides or sponsors health insurance (such as a government health insurer). In various embodiments, the party benefitted by the health cost reduction may also be the issuer of the HCC/transferable financial instrument.

In some embodiments, stage 1730 may include obligating a party benefitted by a health cost reduction associated with the individual (e.g., an insurer) to pay an amount derived from the health cost reduction to a trust, where the trust is formed with an obligation to pay the amount in cash to a holder or owner of the transferable financial instrument, either on demand or under specified contractual terms specified by the instrument. In some such embodiments, the party may be obligated to pay the amount derived from the health cost reduction to the trust in a series of payments over a defined period of time.

One of ordinary skill in the art will recognize that process 1700 depicted in FIG. 17 is an exemplary, generalized illustration and that stages and features may be added to, removed from, or modified within process 1700 without departing from the principles of the invention. For example, a stage may be added to transfer the transferable financial instrument to the individual after receiving the data, such that, for example, the individual owns the financial instrument and thus receives an incentive for having or achieving the metric or performing the behavior. For another example, a stage may be added to transfer the transferable financial instrument to a health care provider after receiving the data, such that, for example, the health care provider owns the financial instrument and thus receives an incentive for providing health care resulting in a positive metric or behavior. In some embodiments, such a stage may be related to the health care provider providing information or direction to the individual regarding the individual's health or the behavior affecting the individual's health. For yet another example, stages may be added to create a trust that is obligated to pay an amount derived from a health cost reduction associated with the individual to a holder of the transferable financial instrument, and to pay the amount derived from the health cost reduction to the trust.

Figure 18:
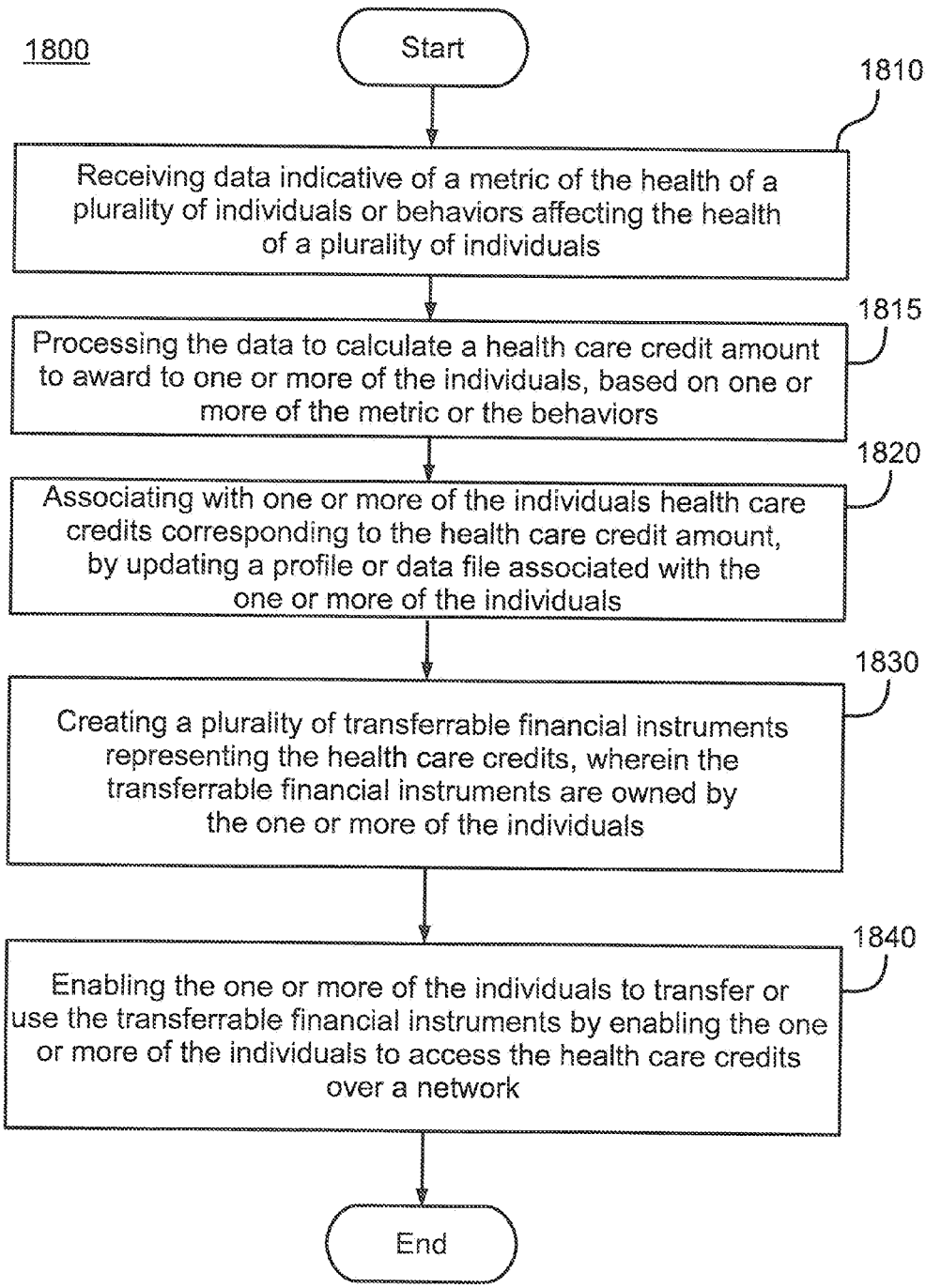
FIG. 18 is a flowchart of an exemplary process associated with a health care credit market, consistent with embodiments of the invention.

FIG. 18 is a flowchart of an exemplary process 1800 associated with a health care credit market, consistent with embodiments of the invention. In some embodiments, process 1800 may be implemented by a computing system, for example, by a computing system provided by an insurance provider, an account provider, an account servicer, or the like, as described in this specification and the incorporated-by-reference applications.

As shown, process 1800 begins with receiving data indicative of a metric of the health of a plurality of individuals or behaviors affecting the health of a plurality of individuals (stage 1810). In various embodiments, the data indicative of a metric of the health of a plurality of individuals may be data gathered or generated as part of health assessments of the individuals, for example, as described with respect to FIGS. 4 and 5 of incorporated by reference application Ser. No. 13/273,430 and Ser. No. 13/273,366, which data may be received over a network. Examples of metrics of health include each individual's weight, body mass index, blood pressure, cholesterol levels, current illnesses or diseases, and the like, or a baseline health level. Similarly, in various embodiments, the data indicative of a behavior affecting the health of the plurality of individuals may be data gathered or generated as part of health assessments, for example, as described with respect to FIGS. 4 and 5 of incorporated by reference application Ser. No. 13/273,430 and Ser. No. 13/273,366. Examples of health-affecting behaviors include exercising, taking of medication, submitting to medical examination, eating healthy foods, reducing calorie intake, reducing body weight, reducing body mass index, having a diagnostic exam, receiving a medical treatment, using a medical device, and ceasing smoking, and the like.

At stage 1815, process 1800 processes the data received in the previous stage to calculate an amount of health care credits to award to one or more of the individuals, based on the metric or behaviors. In various embodiments, stage 1815 may be implemented in manners similar to the embodiments described above with respect to stage 1615 of FIG. 16 and stage 1715 of FIG. 17.

At stage 1820, process 1800 associates the one or more health care credits with the one or more of the individuals, where the one or more HCCs correspond to the amount of HCCs or incentive points calculated in the previous stage. In the embodiment shown, the HCCs are associated with the one or more of the individuals by updating a profile or data file associated with the one or more of the individuals. In various embodiments, the profile or data file may correspond to, be associated with, or be part of an HCC account, such as HCC account 136, 143, 146, 310-325, or 360-375, or the like. In some embodiments, a single HCC account may be controlled by, and owned by, more than one individual, such as, for example, a family account for all the immediate members of a family. In various embodiments, stage 1820 may be implemented in manners similar to the embodiments described above with respect to stage 1620 of FIG. 16 and stage 1720 of FIG. 17.

At stage 1830, process 1800 creates a plurality of transferable financial instruments representing the health care credits, wherein the transferable financial instruments are owned by or transferred to one or more of the individuals. In various embodiments, the transferable financial instruments may be in electronic form or in physical form. In various embodiments, each transferable financial instrument may be a contractual right for the owner of the instrument to receive cash and/or health-care related goods or services from the issuer or other obligated party. In some embodiments, a party such as a health care insurer or health care provider, who may be the issuer of a financial instrument or a beneficiary of the metric or behaviors, may be obligated to redeem the transferable financial instrument for cash. In various embodiments, the stage 1830 may be implemented in manners similar to the embodiments described with respect to stage 1720 of FIG. 17.

At stage 1840, process 1800 enables the one or more of the individuals to transfer or use the transferable financial instruments by enabling the one or more of the individuals to access the health care credits over a network. In various embodiments, enabling the one or more of the individuals to access the health care credits may include providing the individuals with access to and control over an electronic account containing the one or more health care credits. In various embodiments, the account may be an HCC account, such as HCC account 136, 143, 146, 310-325, or 360-375, as described throughout this specification and the incorporated-by-reference applications. Further, in various embodiments, stage 1840 may be implemented in manners similar to the embodiments described with respect to stage 1630 of FIG. 16.

One of ordinary skill in the art will recognize that process 1800 depicted in FIG. 18 is an exemplary, generalized illustration and that stages and features may be added to, removed from, or modified within process 1800 without departing from the principles of the invention. For example, modifications and additions similar to those described with respect to FIGS. 16 and 17 may be made to process 1800.

Figure 19:
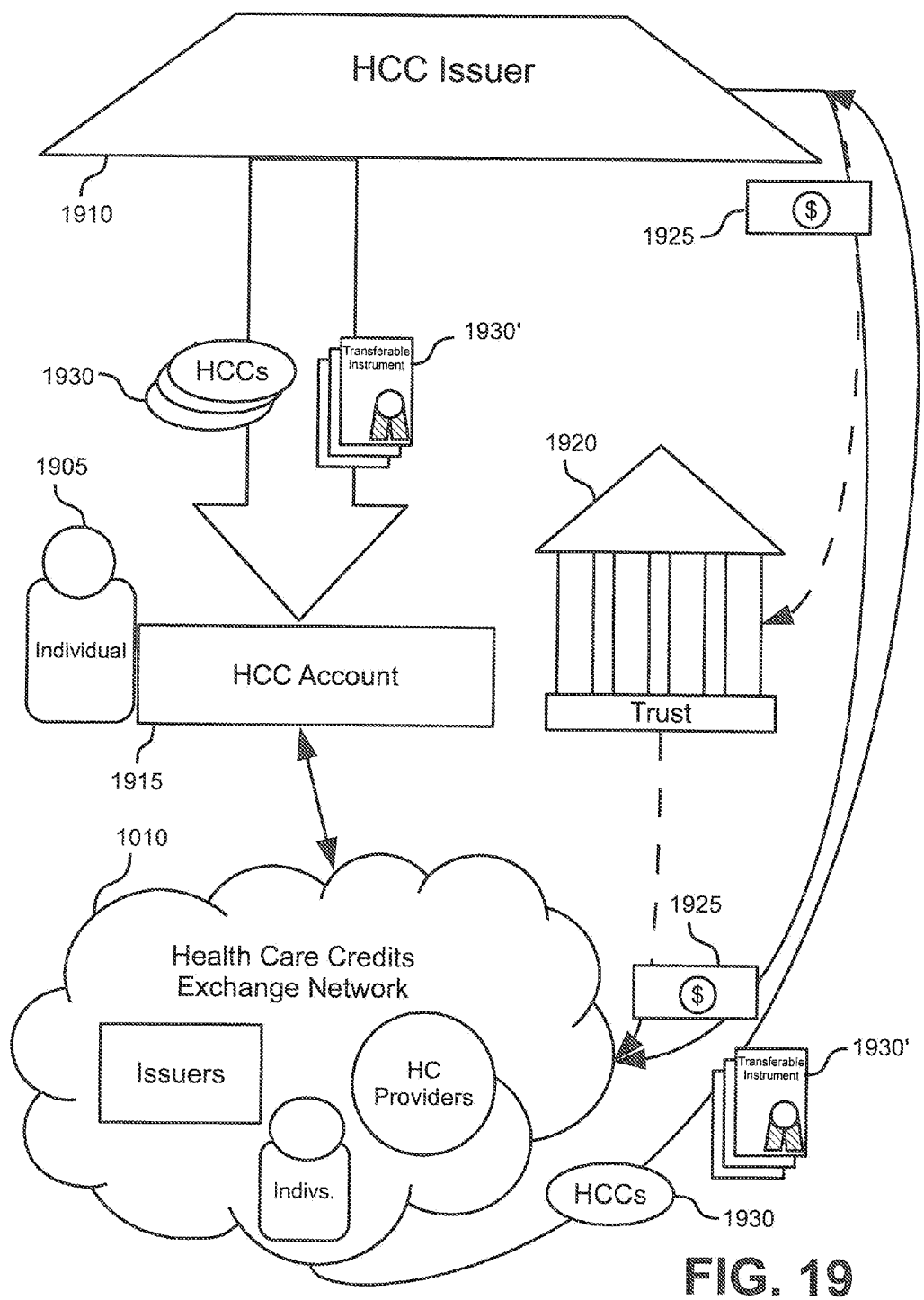
FIG. 19 is a diagram illustrating an exemplary system for creating, transferring, and backing health care credits, consistent with embodiments of the invention.

FIG. 19 is a diagram illustrating an exemplary system for creating, transferring, and backing health care credits, consistent with embodiments of the invention. In the example shown, an HCC issuer 1910, such as a health insurance company or a government-sponsored health insurer, may issue electronic HCCs 1930 and/or physical HCCs 1930' and transfer the HCCs 1930/1930' to an HCC account 1915 accessible by, and controlled by an individual 1905. As explained throughout this specification and the incorporated-by-reference applications, in various embodiments, the HCC issuer 1910 may award or provide the HCCs to the individual 1905 as a reward or incentive for health-benefiting behavior or achievement metric performed or received by individual 1905.

In the embodiment shown, HCCs may be implemented in the form of electronic transferable financial instruments (electronic HCCs 1930) and/or in the form of physical transferable financial instruments (physical HCCs 1930'), or in some combination of the two. In some embodiments, an electronic HCC 1930 may not have a corresponding physical HCC 1930'. In some embodiments, physical HCC 1930' may not have a corresponding electronic HCC 1930'. In other embodiments, physical HCC 1930' may be the definitive legal document that evidences the rights and obligations of the HCC owner and issuer, like a paper stock certificate or paper bond certificate, and physical HCC 1930' may have a corresponding electronic HCC 1930 that represents the physical HCC 1930' to the owner (e.g. individual 1905) and other parties in electronic account systems, electronic trading systems, etc., similar to an electronic stock brokerage account.

In various embodiments, the HCC issuer 1910 may be obligated under the terms of the HCC financial instrument 1930/1930' to provide cash and/or health-care related goods or services to the owner of the HCC financial instrument 1930/1930'. In various embodiments, the amount of cash and/or health-care related goods or services may be related to a cost or cost savings associated with the health-benefiting behavior or achievement metric performed or received by individual 1905, as described throughout this specification and the incorporated-by-reference applications. In various embodiments, HCC issuer 1910 may be desired or required, for example by the terms of HCC financial instrument 1930/1930', to setup, provide, or maintain financial backing for the HCC financial instrument 1930/1930', according to an initial issuing value of HCC financial instrument 1930/1930'. In some embodiments, the HCC issuer 1910 may internally provide for the financial backing for the HCC financial instrument 1930/1930', for example by maintaining an internal cash reserve equivalent to the initial cash value of the HCC, or by budgeting for payment of the initial amount from future revenues.

In other embodiments, the HCC issuer 1910 may use a separate entity for the financial backing for the HCC financial instrument 1930/1930', such as trust 1920 as shown in the embodiment of FIG. 19. In such embodiments, the HCC issuer 1910 may provide cash 1925 to fund the trust 1920 (as represented by the dashed arrow), and the trust 1920 may be organized and obligated to pay out cash 1925 to the owner of the HCC financial instrument 1930/1930' according to the terms of the HCC financial instrument 1930/1930'. The HCC issuer 1910 may initially fund the trust 1920 with an amount of cash 1925 equivalent to the initial value of the HCC financial instrument 1930/1930', as noted above.

The system shown in FIG. 19 also includes a health care credits exchange network 1010, which may be composed of one or more issuers, individuals, and health care providers, among other things. In general, health care credits exchange network 1010 is a network of entities that transfer, buy, sell, exchange, etc. HCCs 1930/1930' amongst each other. As shown, individual 1905 may be connected to, and thus part of, the health care credits exchange network 1010 by virtue of interacting with health care credits exchange network 1010 via the HCC account 1915. Similarly, the HCC issuer 1910 may be part of the health care credits exchange network 1010.

In the embodiment shown, an entity that is part of the health care credits exchange network 1010 may redeem or sell HCC financially instruments 1930/1930' to the HCC issuer 1910 in exchange for an amount of cash 1925 (or in some embodiments, goods or services) according to terms specified by the HCC financially instruments 1930/1930'. As shown, in some embodiments, as represented by the solid arrow from the HCC issuer 1910 to the HCC exchange network 1010, the HCC issuer 1910 may directly pay the cash 1925 to the owner of the redeemed HCC financial instruments 1930/1930'. In other embodiments, as represented by the dashed arrow from the HCC issuer 1910 to the trust 1920, and from the trust 1920 to the HCC exchange network 1010, the HCC issuer 1910 may have paid the cash 1925 to the trust 1920 at an earlier time, such as at issuance, and the trust 1920 may later pay the cash 1925 to the owner of the redeemed HCC financial instruments 1930/1930' according to the terms of HCC financial instrument 1930/1930'.

In various embodiments, the amount of cash 1925 obligated to be paid to the owner of the HCC financial instrument 1930/1930' by the terms of HCC financial instrument 1930/1930' may be different than the market value of the HCC financial instrument 1930/1930' among the entities of HCC exchange network 1010. In various market situations, the supply and demand of HCCs 1930/1930' in the HCC exchange network 1010 may make their market price substantially higher or lower than their price at issuance and/or their price as specified by the terms of HCC financial instrument 1930/1930'.

One of ordinary skill in the art will recognize that system 100 depicted in FIG. 1 is an exemplary, generalized illustration and that components and features may be added to, removed from, or modified within system 100 without departing from the principles of the invention. For one example, an entity may be inserted between HCC Issuer 1910 and HCC account 1915, which converts non-transferable credits or incentive points issued by HCC Issuer 1910 into HCCs that are transferable financial instruments.

The processing of a method, process, or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. In some embodiments, the storage medium may be integral to the processor. The processor and the storage medium may reside in an ASIC. The ASIC may reside in a computing device or computing system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented using a computing system, of managing a health care credit, the method comprising:
   receiving a metric measuring health, maintenance of health, or an improvement in health for an individual;
   calculating, using the computing system, an amount of freely transferable non-monetary consideration to award to the individual based on the metric; and
   updating, using the computing system, a health care profile associated with the individual by storing the metric and the calculated amount of freely transferable non-monetary consideration in a storage device that includes the health care profile.

2. The method of claim 1, further comprising:
   transmitting data representing the metric and the calculated amount of freely transferable non-monetary consideration from the health care profile to an entity.

3. The method of claim 2, wherein the entity is a financial services company.

4. The method of claim 3, wherein the financial services company is a health care derivative administrator.

5. The method of claim 2, wherein the entity is a data repository for health care data.

6. The method of claim 2, wherein the entity is a health insurer.

7. The method of claim 2, wherein the entity is an employer of the individual.

8. The method of claim 2, wherein the entity is a government or a government agency.

9. An apparatus comprising:
   a memory containing instructions; and
   a processor, operably connected to the memory, that executes the instructions to perform operations comprising:
   receiving a metric measuring health, maintenance of health, or an improvement in health for an individual;
   calculating an amount of freely transferable non-monetary consideration to award to the individual based on the metric; and
   updating a health care profile associated with the individual using the metric and the calculated amount of freely transferable non-monetary consideration.

10. The apparatus of claim 9, the operations further comprising:
    transmitting data representing the metric and the calculated amount of freely transferable non-monetary consideration from the health care profile to an entity.

11. The apparatus of claim 10, wherein the entity is a financial services company.

12. The apparatus of claim 11, wherein the financial services company is a health care derivative administrator.

13. The apparatus of claim 10, wherein the entity is a data repository for health care data.

14. The apparatus of claim 10, wherein the entity is a health insurer.

15. The apparatus of claim 10, wherein the entity is an employer of the individual.

16. The apparatus of claim 10, wherein the entity is a government or a government agency.

17. A non-transitory computer-readable medium containing instruction that, when executed by a processor, perform operations comprising:
    receiving a metric measuring health, maintenance of health, or an improvement in health for an individual;
    calculating an amount of freely transferable non-monetary consideration to award to the individual based on the metric; and
    updating a health care profile associated with the individual using the metric and the calculated amount of freely transferable non-monetary consideration.

18. The non-transitory computer-readable medium of claim 17, the operations further comprising:
    transmitting data representing the metric and the calculated amount of freely transferable non-monetary consideration from the health care profile to an entity.

19. The non-transitory computer-readable medium of claim 18, wherein the entity is a financial services company.

20. The non-transitory computer-readable medium of claim 19, wherein the financial services company is a health care derivative administrator.

21. The non-transitory computer-readable medium of claim 18, wherein the entity is a data repository for health care data.

22. The non-transitory computer-readable medium of claim 18, wherein the entity is a health insurer.

23. The non-transitory computer-readable medium of claim 18, wherein the entity is an employer of the individual.

24. The non-transitory computer-readable medium of claim 18, wherein the entity is a government or a government agency.

25. A method, implemented using a computing system, for administering a health care derivative, the method comprising:
- creating the health care derivative, wherein the health care derivative has a monetary value that depends upon fulfilling a condition related to health care, wherein the condition is specified by the health care derivative;
- collecting data related to health care and the condition specified by the health care derivative;
- determining, using the computing system and from the data, whether the condition has been fulfilled;
- increasing, using the computing system, the monetary value of the health care derivative when the condition has been fulfilled.

26. The method of claim 25, wherein the condition related to health care comprises a condition related to a flow of health care credits,
- wherein the health care credits represent good health, an improvement in health, a health-benefiting behavior, or maintenance of health.

27. The method of claim 26, wherein the health care credits were created as an award for good health, an improvement in health, or maintenance of health.

28. The method of claim 26, wherein the condition related to a flow of health care credits comprises transferring a specified amount of health care credits to a specified entity.

29. The method of claim 25, further comprising:
- decreasing the monetary value of the health care derivative when the condition has not been fulfilled.

30. The method of claim 25, further comprising:
- paying, to a holder of the health care derivative, cash in an amount substantially equal to the monetary value of the health care derivative.

31. The method of claim 25, further comprising:
- selling the health care derivative.

32. An apparatus comprising:
- a memory containing instructions; and
- a processor, operably connected to the memory, that executes the instructions to perform operations comprising:
  - creating a health care derivative, wherein the health care derivative has a monetary value that depends upon fulfilling a condition related to health care, wherein the condition is specified by the health care derivative;
  - collecting data related to health care and the condition specified by the health care derivative;
  - determining, from the data, whether the condition has been fulfilled;
  - increasing the monetary value of the health care derivative when the condition has been fulfilled.

33. The apparatus of claim 32, wherein the condition related to health care comprises a condition related to a flow of health care credits,
- wherein the health care credits represent good health, an improvement in health, a health-benefiting behavior, or maintenance of health.

34. The apparatus of claim 33, wherein the health care credits were created as an award for good health, an improvement in health, or maintenance of health.

35. The apparatus of claim 33, wherein the condition related to a flow of health care credits comprises transferring a specified amount of health care credits to a specified entity.

36. The apparatus of claim 32, the operations further comprising:
- decreasing the monetary value of the health care derivative when the condition has not been fulfilled.

37. The apparatus of claim 32, the operations further comprising:
- paying, to a holder of the health care derivative, cash in an amount substantially equal to the monetary value of the health care derivative.

38. The apparatus of claim 32, the operations further comprising:
- selling the health care derivative.

39. A non-transitory computer-readable medium containing instruction that, when executed by a processor, perform operations comprising:
- creating a health care derivative, wherein the health care derivative has a monetary value that depends upon fulfilling a condition related to health care, wherein the condition is specified by the health care derivative;
- collecting data related to health care and the condition specified by the health care derivative;
- determining, from the data, whether the condition has been fulfilled;
- increasing the monetary value of the health care derivative when the condition has been fulfilled.

40. The non-transitory computer-readable medium of claim 39, the operations further comprising:
- decreasing the monetary value of the health care derivative when the condition has not been fulfilled.

41. The non-transitory computer-readable medium of claim 39, the operations further comprising:
- paying, to a holder of the health care derivative, cash in an amount substantially equal to the monetary value of the health care derivative.

42. The non-transitory computer-readable medium of claim 39, wherein the condition related to health care comprises a condition related to a flow of health care credits,
- wherein the health care credits represent good health, an improvement in health, a health-benefiting behavior, or maintenance of health.

43. The non-transitory computer-readable medium of claim 39, wherein the health care credits were created as an award for good health, an improvement in health, or maintenance of health.

44. The non-transitory computer-readable medium of claim 39, wherein the condition related to a flow of health care credits comprises transferring a specified amount of health care credits to a specified entity.

45. The non-transitory computer-readable medium of claim 39, further comprising:
- selling the health care derivative.

* * * * *